United States Patent
Kumazawa et al.

(10) Patent No.: US 7,401,390 B2
(45) Date of Patent: *Jul. 22, 2008

(54) TENTER DEVICE AND METHOD FOR DRYING FILM

(75) Inventors: Takao Kumazawa, Kanagawa (JP); Takashi Takeuchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/662,626

(22) PCT Filed: Sep. 22, 2005

(86) PCT No.: PCT/JP2005/018067

§ 371 (c)(1),
(2), (4) Date: Mar. 13, 2007

(87) PCT Pub. No.: WO2006/035922

PCT Pub. Date: Apr. 6, 2006

(65) Prior Publication Data

US 2007/0261218 A1    Nov. 15, 2007

(30) Foreign Application Priority Data

Sep. 27, 2004   (JP) .............................. 2004-279571

(51) Int. Cl.
*D06C 3/04*   (2006.01)
(52) U.S. Cl. ............................................ 26/93; 26/92

(58) Field of Classification Search ............... 26/87–91, 26/92, 93, 94, 95, 96, 98, 106, 72, 73; 34/61, 34/62, 66, 67, 85, 90, 623, 646, 658–661, 34/629, 638, 639; 264/288.4, 289.6, 290.2; 198/493, 495, 803.3, 803.7

See application file for complete search history.

(56) References Cited

U.S. PATENT DOCUMENTS

| | | | | |
|---|---|---|---|---|
| 3,469,291 A | * | 9/1969 | Gageur | 26/93 |
| 3,500,515 A | * | 3/1970 | Cunningham et al. | 26/93 |
| 3,580,451 A | * | 5/1971 | Fraitzl | 226/173 |
| 3,779,918 A | * | 12/1973 | Ikeda et al. | 508/100 |
| 3,789,975 A | * | 2/1974 | Ida et al. | 198/493 |
| 5,067,214 A | * | 11/1991 | Hosmer et al. | 26/89 |

(Continued)

FOREIGN PATENT DOCUMENTS

JP   61-124462 A   6/1986

(Continued)

*Primary Examiner*—Amy B Vanatta
(74) *Attorney, Agent, or Firm*—Sughrue Mion, PLLC

(57) ABSTRACT

A clip (10) has a frame (31) and a flapper (32). Two dry bearings (37) are inserted into a hole (32d) formed in the flapper. Then an attaching shaft (35) is inserted from one of the holes (34a) in the frame (31) to the other through the dry bearings (37), so as to swingably attaching the flapper (32) to the frame (31). DAIDAYNE DDK 01 of DAIDO METAL Corp. is used as the dry bearing (37). A first and a second clip covers (51,52) are provided to cover the clips (10). Fresh air feeding pipes (55) are connected to the first and second clip covers (51,52). Fresh air is fed from the fresh air feeding pipes (55) toward the clips (10) through air outlets (56) provided in the first and second clip covers (51,52).

13 Claims, 9 Drawing Sheets

U.S. PATENT DOCUMENTS

| | | | |
|---|---|---|---|
| 5,159,733 A * | 11/1992 | Fleming et al. | 26/93 |
| 5,613,284 A * | 3/1997 | Hosmer | 26/89 |
| 5,749,131 A * | 5/1998 | Breil et al. | 26/89 |
| 5,771,547 A * | 6/1998 | Hommes et al. | 26/93 |
| 5,791,031 A * | 8/1998 | Steffl | 26/93 |
| 7,162,781 B2 * | 1/2007 | Kumazawa et al. | 26/93 |

FOREIGN PATENT DOCUMENTS

| | | |
|---|---|---|
| JP | 62-119219 U | 7/1987 |
| JP | 1-180455 U | 12/1989 |
| JP | 5-140723 A | 6/1993 |
| JP | 11-77719 A | 3/1999 |
| JP | 11-90943 A | 4/1999 |
| JP | 2003-207628 A | 7/2003 |
| JP | 2004-230713 A | 8/2004 |

\* cited by examiner

TENTER DEVICE AND METHOD FOR DRYING FILM

TECHNICAL FIELD

The present invention relates to a tenter device used in a film production apparatus for solution casting method.

BACKGROUND ART

To produce a polymer film having no unevenness of thickness and optical properties, a tenter device has clips for holding lateral edges of the film, and moves the clips which hold the film. The film is dried while being transported. The clip is assembled such that a flapper is swingably attached to a U-shaped frame through an attaching shaft and dry bearings. The flapper is biased to a holding position by own weight. When the flapper is at the holding position, the film is held between a lower end surface of the flapper and a film holding surface of the frame. In addition, when an upper end surface of the flapper contacts a clip opener, the flapper is swung to a retreat position where the holding of the film is released. The clip starts the holding of the film at an entrance of the tenter device, and releases the holding at an exit of the tenter device. Tenter devices using this type of clips are disclosed in Japanese Patent Laid-Open Publications No. 11-77719 and No. 11-90943.

However, in case the conventional tenter device is used for producing cellulose acylate film, although at beginning the film having high retardation value and superior optical properties can be produced, then after a certain period of time, the some clips start misholding of the film because of poorly smoothness of the swing of the flapper. When the part of the film is misheld by the clip, there occurs the unevenness of thickness or optical properties of the dried film.

In addition, there becomes a possibility to break the soft film formed by solution casting, when springs or the like are used for biasing the swing of the flapper so that the flapper is swung to the holding position regardless of lack of the smoothness of swing.

An object of the present invention is to provide a tenter device used in a film producing apparatus for solution casting method, in which smoothness of swing of a clip does not become lower even after a certain period of time has passed.

DISCLOSURE OF INVENTION

In keen examination, the inventor found that TPP (triphenyl phosphate) contained in a film as a plasticizer is vaporized from the film when the film is dried, the vaporized TPP is condensed as dew on a dry bearing of the clip, and then the condensed TPP and dust from the dry bearing are bound together to be crystallized mass. The dust is generated by slide friction between the dry bearing and an attaching shaft. The slide smoothness of the dry bearing becomes reduced by the existence of the crystal. Accordingly, it becomes that the clip cannot be moved to a film holding position by biasing of own weight.

In order to achieve the object and other objects, a tenter device of the present invention comprises clips for clipping a film and moving for transporting the film, between a clip start position for clipping lateral edges of a film and a clip release position for releasing the clipping of the film, a dry air blower for feeding dry air toward the film for drying the film while the film is transported, and a clip cover for covering a moving path of the clip in clipping the film.

It is preferable that the tenter device further comprises a fresh air blower for feeding fresh air into inside of the clip cover so as to prevent the dry air in outside of the clip cover blowing into inside of the clip cover.

It is preferable that the clip comprises a main body having a film holding surface on which the lateral edge of the film is positioned, a holding lever swingable between a holding position for holding the lateral edge of the film on the film holding surface and a retreat position for releasing the holding of the film, an attaching shaft for attaching the holding lever to the main body, and at least one dry bearing supporting the attaching shaft, the dry bearing being formed of material which generate lower dust by wearing compared to material containing lead and is self-lubricating.

In addition, it is preferable that the film is a cellulose acylate film.

In order to achieve the object and other objects, in a film drying method for drying a film produced by solution casting, the film is dried by dry air fed from a dry air blower while the film is transported, the transporting of the film is performed by clips for clipping the film and moving between a clip start position for clipping lateral edges of the film and a clip release position for releasing the clipping of the film. The film drying method comprises steps of moving the clip with covered by a clip cover, cyclically from the clip start position to the clip release position, and feeding fresh air into inside of the clip cover by a fresh air blower so as to prevent the dry air in outside of the clip cover blowing into inside of the clip cover.

According to the tenter device of the present invention, since the clip cover is provided for covering the moving path of the clip in clipping the film, it is prevented that the vaporized content of the film in the dry air and dust particles on the dry bearing generated by the wearing are bound to form mass. Therefore, the smoothness of swing of the clip hardly becomes lower.

In addition, in case the tenter device further comprises the fresh air blower for feeding fresh air into inside of the clip cover so as to prevent the dry air in outside of the clip cover blowing into inside the clip cover, it is further prevented that the vaporized content of the film in the dry air and dust particles on the dry bearing generated by the wearing are bound to form mass.

In addition, in case the dry bearing is formed of at least one material which generate lower dust by wearing compared to material containing lead and is self-lubricating, it is further prevented that the vaporized content of the film in the dry air and dust particles on the dry bearing generated by the wearing are bound to form mass.

According to the film drying method of the present invention, the clips are covered by the clip cover, and the fresh air is fed into inside of the clip cover by the fresh air blower so as to prevent the dry air in outside of the clip cover blowing into inside the clip cover. Therefore, the smoothness of swing of the clip hardly becomes lower and the film having superior optical properties can be constantly produced.

BEST MODE FOR CARRYING OUT THE INVENTION

Figure 1:
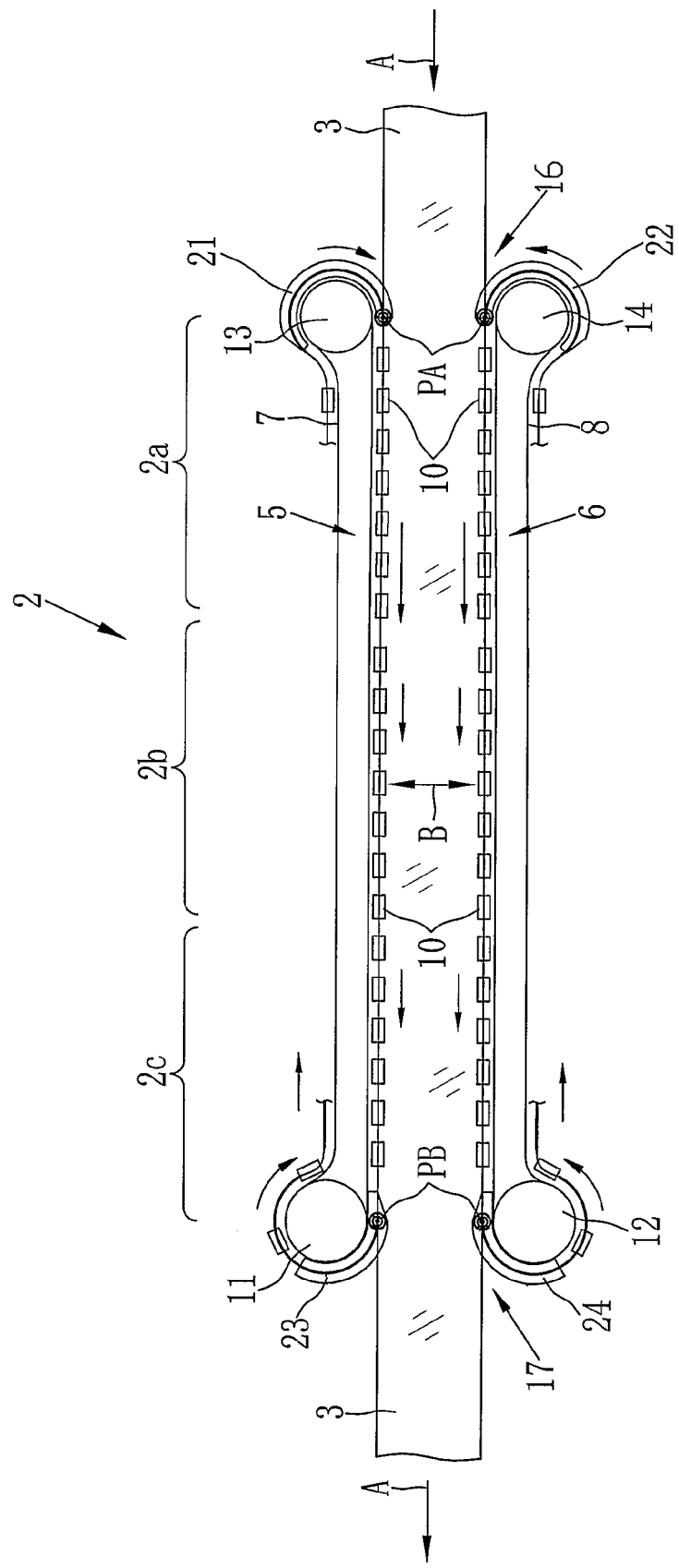
FIG. 1 is a top plan view of a tenter device of the present invention.

As shown in FIG. 1, a tenter device 2 is used for drying a wet film 3 peeled from a casting belt 113 (refer to FIG. 9), with transporting the wet film 3 in a film feeding direction A and stretching the wet film 3 in a width direction B of the wet film 3. The tenter device 2 comprises a first rail 5, a second rail 6, and a first and a second chains (endless chains) 7, 8 which are guided by the rails 5,6. The tenter device 2 has three areas, which are a first drying area 2a, a second drying area 2b and a third drying area 2c arranged in this order from a tenter device inlet 16. In each drying areas 2a-2c, dry air is fed from a dry air circulation unit 60 (refer to FIG. 7) toward the wet film 3. Accordingly, the wet film 3 being transported in the drying areas 2a,2b,2c becomes dried. Although the tenter device 2 has three areas in this embodiment, the number of the areas is not limited to this embodiment.

To the first and second chains 7,8, plural clips 10 are attached at certain intervals. The clips 10 hold lateral edges of the wet film 3 and move along the rails 5,6. While the movement of the clips 10, the wet film 3 is stretched in the width direction B. Note that in this embodiment, when the width of the wet film 3 before being stretched was 100%, that of the stretched film 3 was 103%. However, the stretching ratio is not limited to this embodiment.

The first and second chains 7,8 are hanged on drive sprockets 11,12 and driven sprockets 13,14, respectively. The drive sprockets 11,12 are provided in a side of a tenter device outlet 17, and rotated by drivers (not shown). The driven sprockets 13,14 are provided in a side of the tenter device inlet 16. At the tenter device inlet 16, clip openers 21,22 for opening the clip 10 to a retreat position are attached to the first and second rails 5,6, respectively. At the tenter device outlet 17, also clip openers 23,24 are attached to the first and second rails 5,6, respectively.

Figure 2:
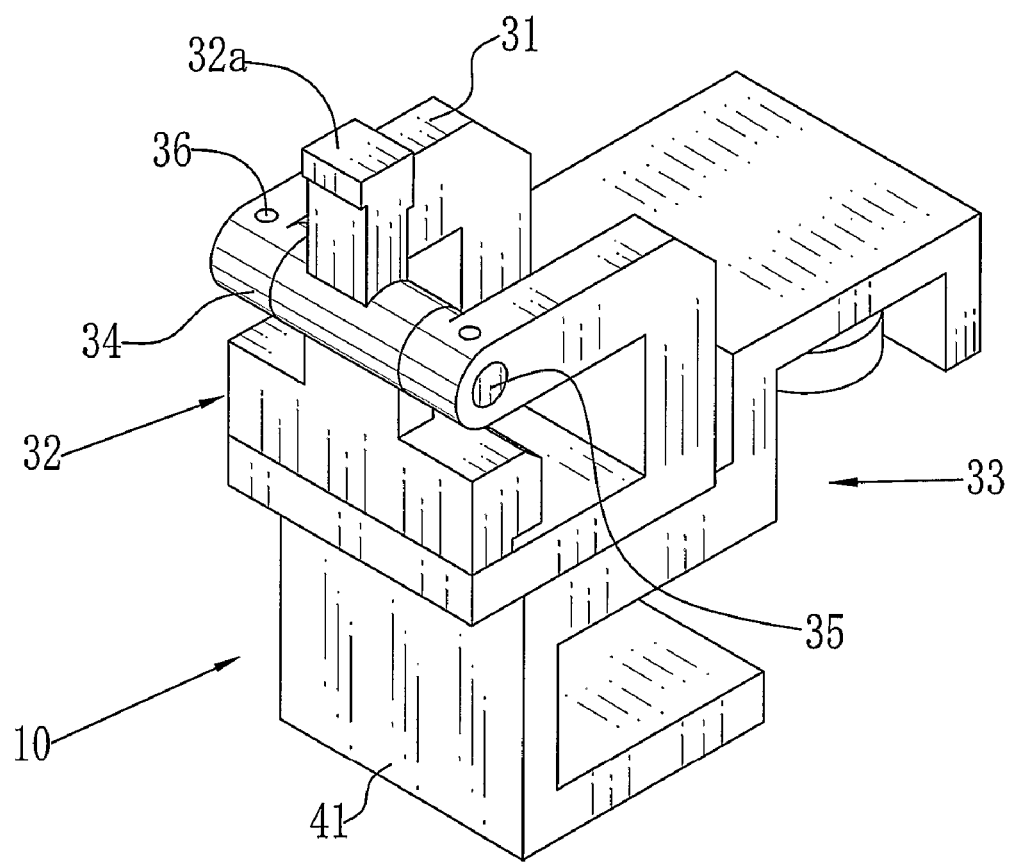
FIG. 2 is a perspective view of a clip in the tenter device.
Figure 3:
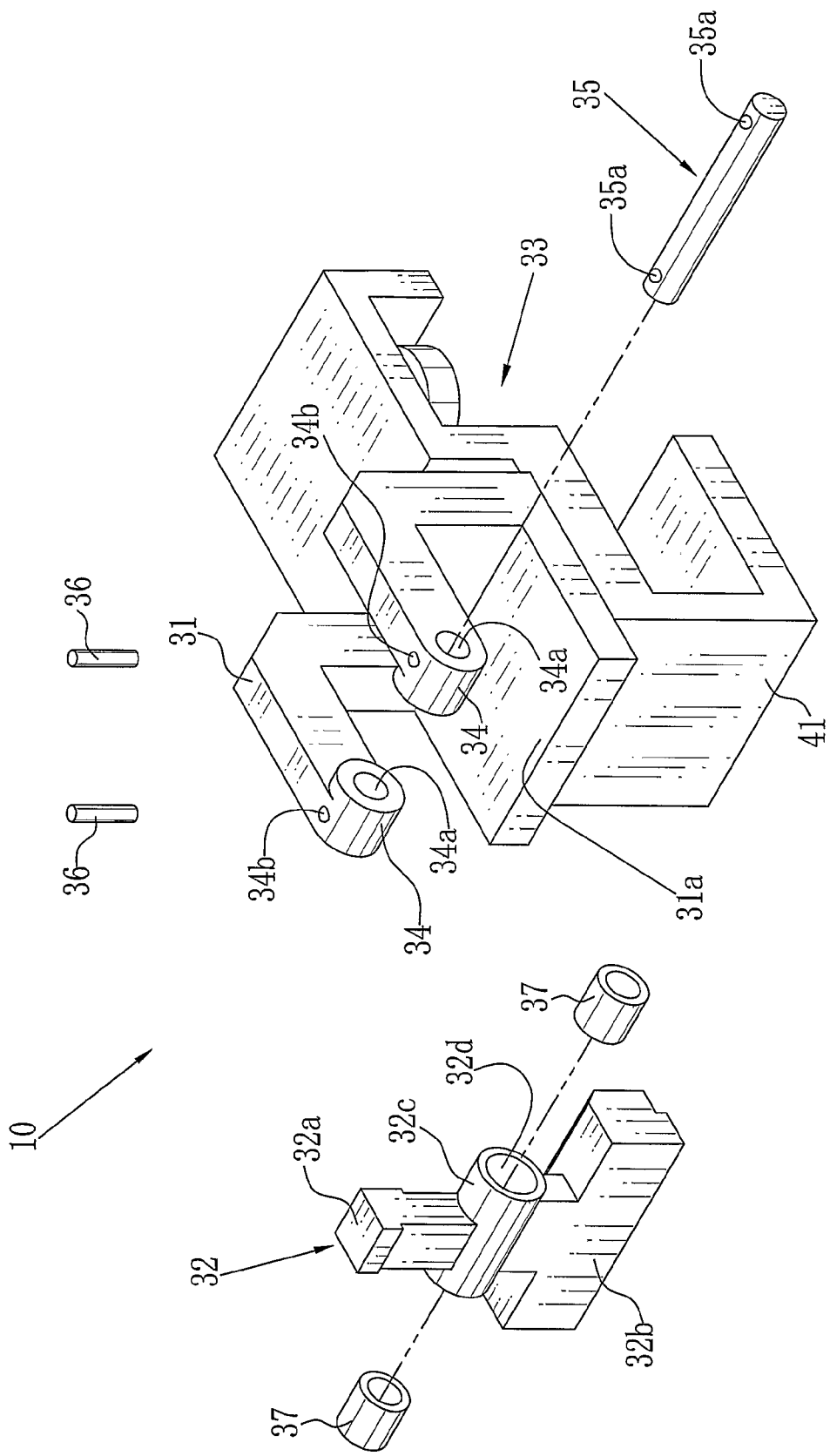
FIG. 3 is an exploded perspective view of the clip in FIG. 2.

As shown in FIG. 2 and FIG. 3, the clip 10 comprises a U-shaped frame (clip main body) 31, a flapper (holding lever) 32 and a rail attaching portion 33. In the frame 31, two flapper attaching portions 34 are formed for attaching the flapper 32 to the frame 31. In the flapper attaching portion 34, there are a hole 34a for insertion of an attachment shaft 35, and a hole 34b for insertion of a fixing pin 36. The fixing pin 36 is for fixing the attachment shaft 35 inserted into the hole 34a. The hole 34b for the fixing pin 36 penetrates the flapper attaching portion 34 in up-and-down direction. In the attachment shaft 35, holes 35a for insertion of the fixing pins 36 are formed at positions corresponding to the holes 34b of the flapper attaching portion 34.

The flapper 32 comprises a contact head 32a for contacting to the clip openers 21-24, a film holder 32b for holding the wet film 3 on a film holding surface 31a of the frame 31, a rotational shaft 32c, and a hole 32d penetrating the rotational shaft 32c for insertion of dry bearings 37 from ends thereof. Therefore, the dry bearing 37 is formed from materials having press-fittability (for example plastics). In this embodiment, DAIDAYNE DDK 01 of DAIDO METAL Corp. is used as the dry bearing 37.

An assemble method of the clip 10 is now described. At first, the dry bearings 37 are inserted into the both ends of the hole 32d of the flapper 32. Then the attachment shaft 35 is inserted from the one of the holes 34a to the other through the dry bearings 37, and the two of fixing pin 36 are inserted into the holes 34b,35a. Accordingly, the attachment shaft 35 is fixed to the flapper attaching portion 34 with inability to rotate, and the flapper 32 is rotatably attached to the frame 31. While the flapper 32 rotating, the dry bearings 37 slide on the attachment shaft 35.

Figure 4:
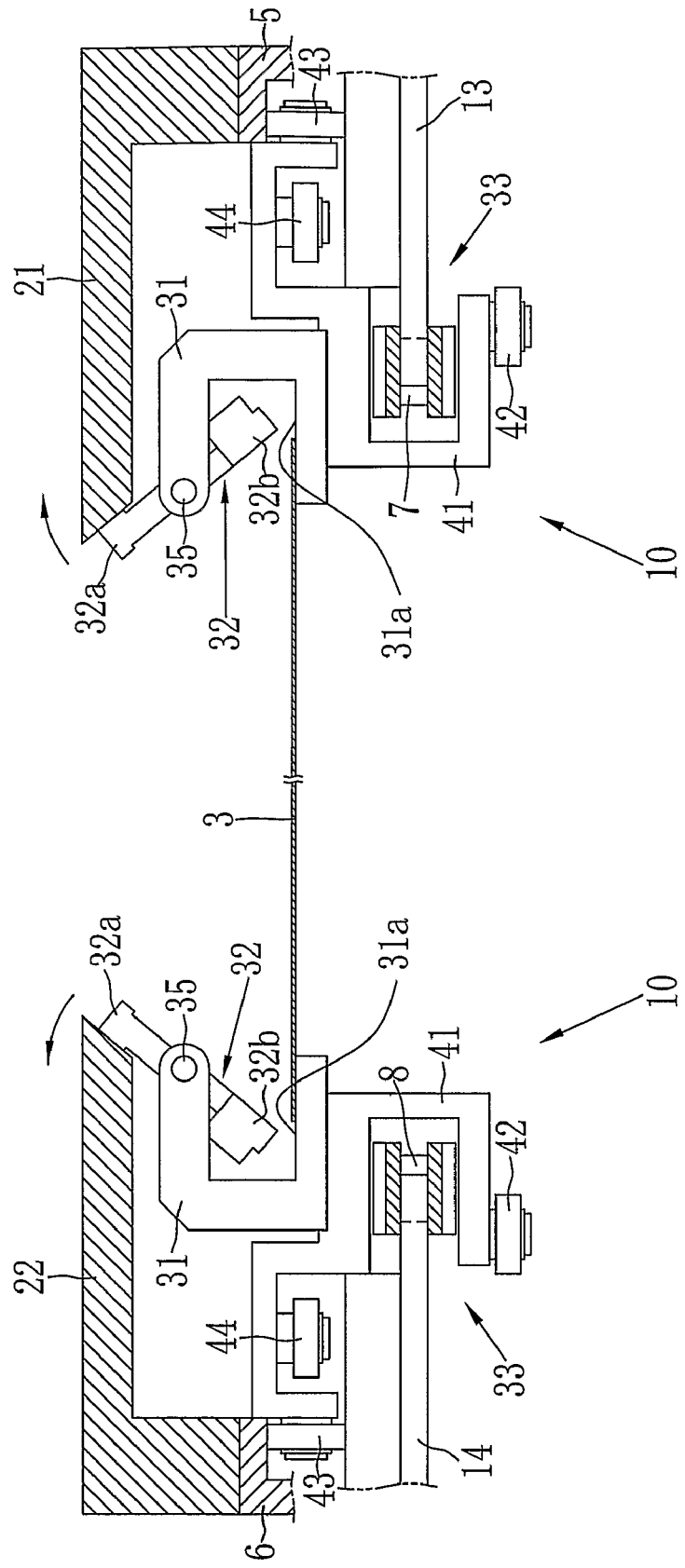
FIG. 4 is a cross-sectional view of the tenter device, in which the clip does not hold a film.
Figure 5:
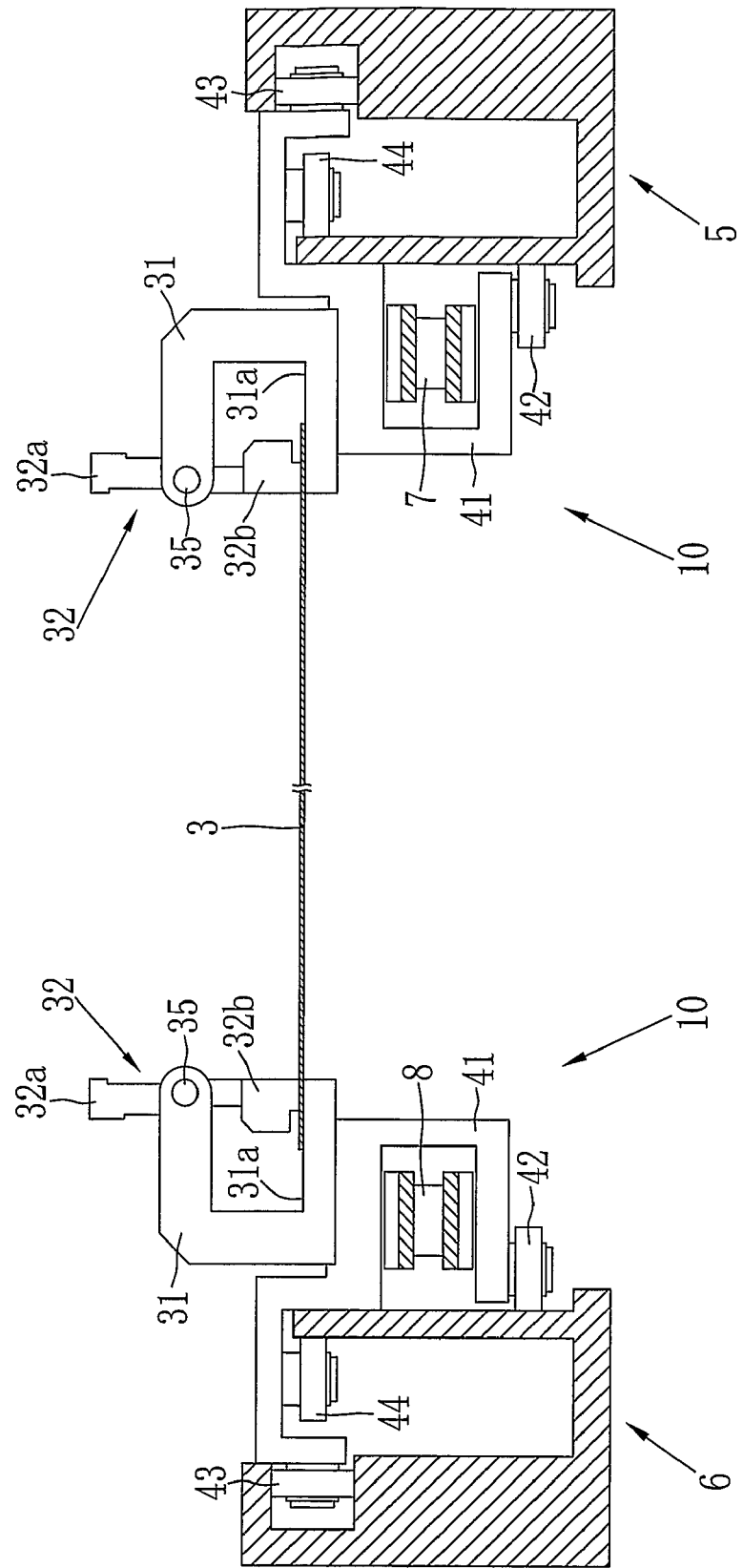
FIG. 5 is a cross-sectional view of the tenter device, in which the clip holds the film.

As shown in FIG. 4 and FIG. 5, the rail attaching portion 33 is attached to the first chain 7 or the second chain 8. The flapper 32 rotates between a film holding position (holding position), where the flapper is at right angle to the film holding surface 31a, and the retreat position, where the flapper is at a slant to the film holding surface 31a because the contact head 32a contacts one of the clip openers 21-24. The flapper 32 is biased to the holding position by an own weight. At a film holding start position (start position) PA (refer to FIG. 1), the wet film 3 is held between the film holding surface 31a and the film holder 32b.

The rail attaching portion 33 comprises an attachment frame 41 and guide rollers 42-44. To the attachment frame 41, one of the first and second chains 7,8 is attached. The guide rollers 42-44 are rotated with contacting the driven sprocket 13,14 and the first and second rails 5,6. Therefore, the clip 10 does not drop off from the sprockets 13,14 and the rails 5,6.

The clip opener 21/22 contacts the contact head 32a of the flapper 32 of the clip 10 right before the clip 10 reaches to the start position PA, so that the flapper 32 is rotated from the holding position to the retreat position. Then the lateral side of the wet film 3 is positioned on the film holding surface 31a of the frame 31. When the clip 10 passes the start position PA, the contact head 32a is apart from the clip opener 21/22 so that the flapper 32 is rotated from the retreat position to the holding position. Accordingly, the lateral side of the wet film 3 is held between the film holding surface 31a and the film holder 32b. In the same way, the clip opener 23/24 rotates the clip 10 from the holding position to the retreat position at a film holding release position (release position) PB. Then the holding of the lateral side of the wet film 3 is released, and the wet film 3 goes outside of the tenter device 2 from the tenter device outlet 17. The wet film 3 out from the tenter device outlet 17 is fed to an edge slitting device 142 as a film 141 (refer to FIG. 9). Note that the clip openers 21-24 are preferably formed from resin, such that the friction between the clip opener and the contact head 32a of the flapper 32 is kept low. As the resin, nylon, Delrin® and the like are preferably used.

Figure 6:
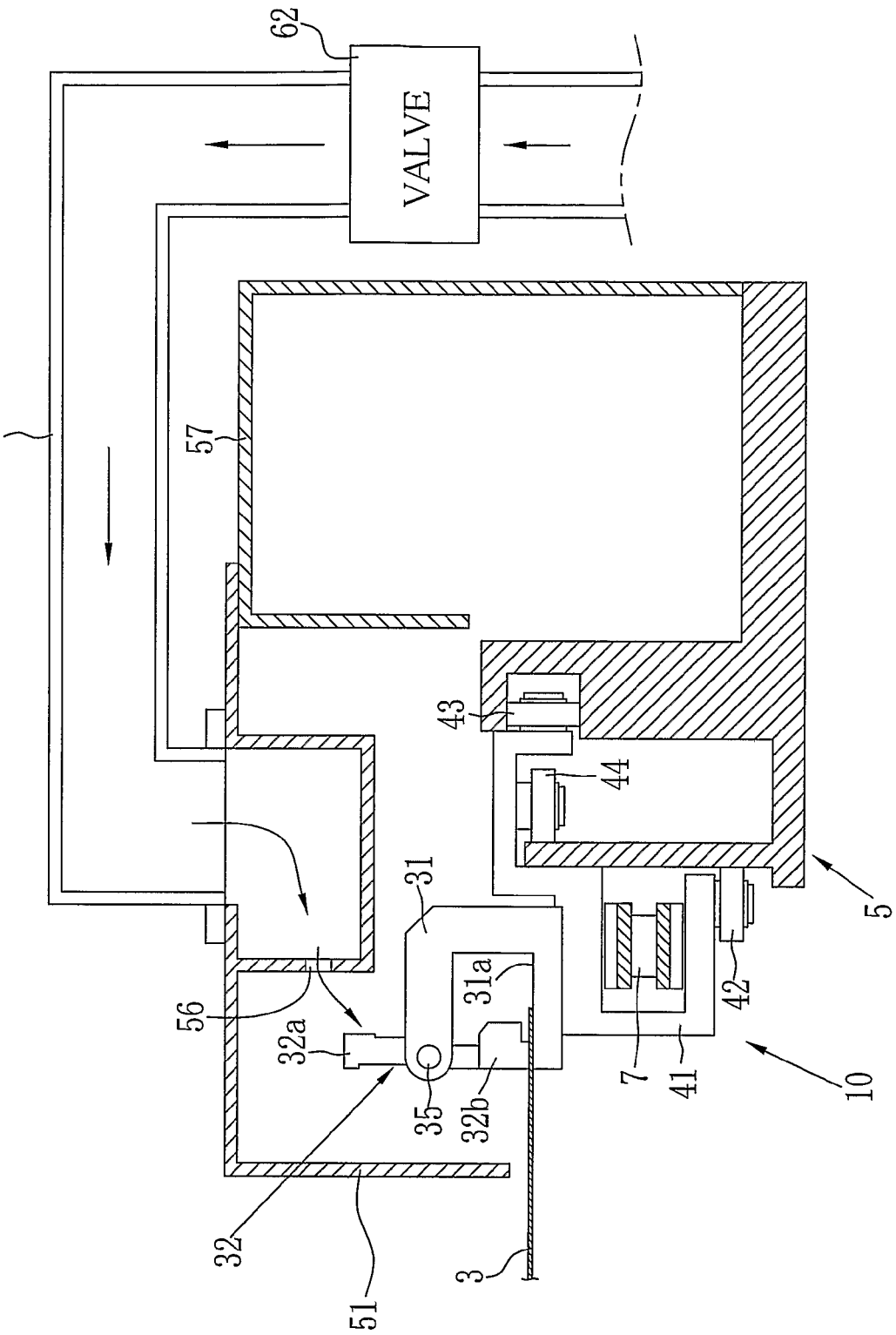
FIG. 6 is a cross-sectional view of the clip, a first clip cover and a fresh air feeding pipe.
Figure 7:
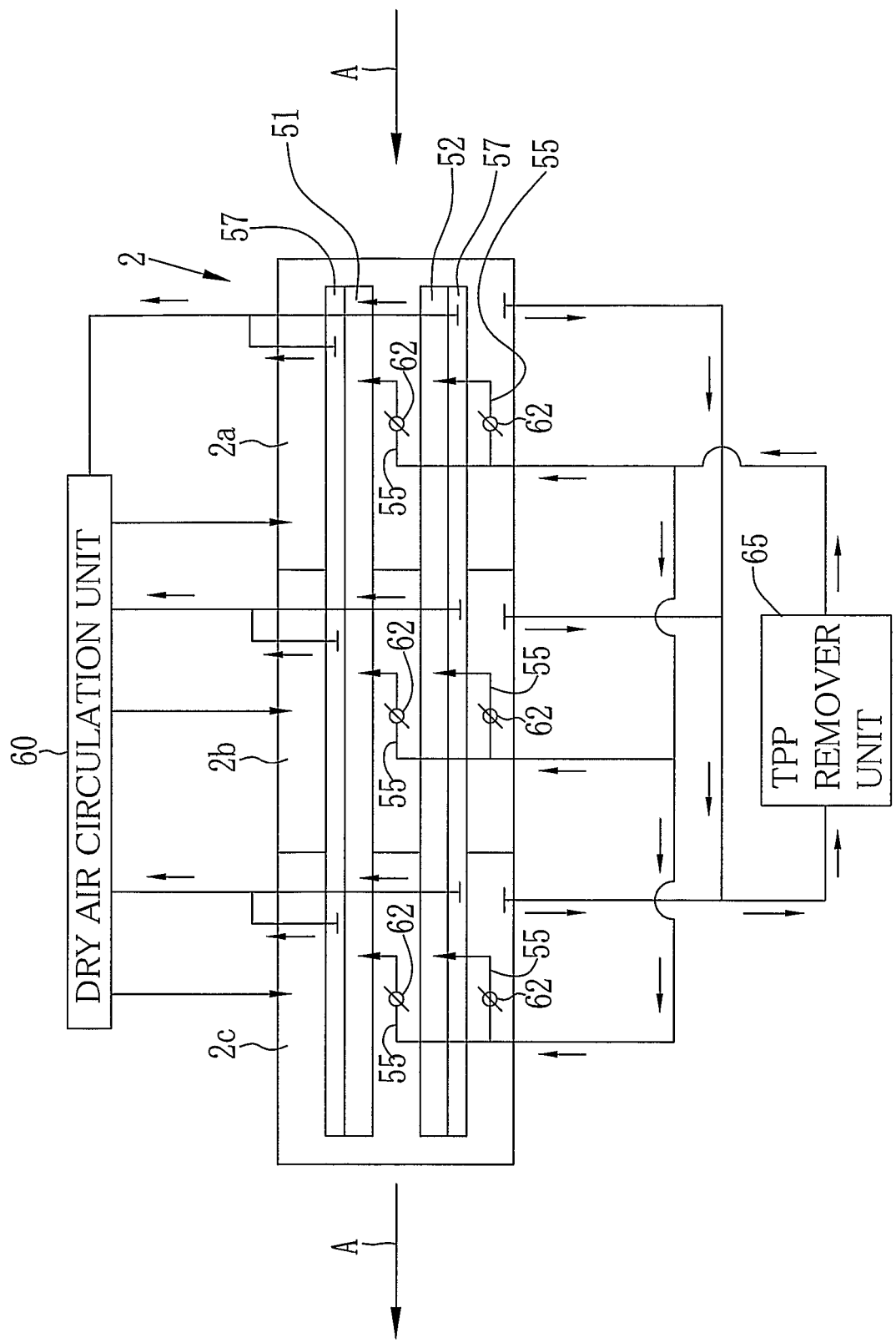
FIG. 7 is a schematic view of the tenter device, showing the first and second clip covers and a TPP removing unit.

As shown in FIG. 6 and FIG. 7, first and second clip covers 51,52 are provided respectively above the first and second rails 5,6, so as to cover the clip 10. The first and second clip covers 51,52 extend between the start position PA and the release position PB in the tenter device 2. The second clip cover 52 has a same structure of the first clip cover 51, therefore only the first clip cover 51 is described later in detail.

As shown in FIG. 6, the first clip cover 51 covers the frame 31 and the flapper 32 of the clip 10 moving along the first rail 5. To the first clip cover 51, fresh air feeding pipes 55 are connected. The connected position of each of the air feeding pipes 55 corresponds to the each of drying areas 2a-2c. The fresh air feeding pipe 55 is for feeding fresh air toward the clip 10, mainly the flapper 32. Flow volume of the fresh air is controlled by a valve 62 connected to the air feeding pipe 55.

The fresh air fed from the fresh air feeding pipe 55 blows toward the flapper 32 through an air outlet 56 provided in the first clip cover 51. The air outlet 56 extends along the first clip cover 51 in the film feeding direction A. Since the fresh air is contained inside the first clip cover 51 so that the pressure inside the first clip cover 51 becomes higher than that outside thereof, it is prevented that the dry air for drying the wet film 3 contacts the clip 10.

To the first and second clip covers 51,52 respectively, an exhaust cover 57 is connected. The fresh air inside the clip covers 51,52 is send to a cooling device (not shown) through the exhaust cover 57, and the cooled fresh air is send to the dry air circulation unit 60. In the dry air circulation unit 60, a temperature of the fresh air is regulated to a predetermined range by a heat exchanger (not shown). The regulated air is fed toward the each of drying areas 2a-2c as the dry air.

As shown in FIG. 7, the dry air in the each of drying areas 2a-2c is send to a TPP removing unit 65 connected to the respective drying areas 2a-2c. In the drying areas 2a-2c, TPP (triphenyl phosphate) contained in the wet film 3 as a plasticizer is vaporized. Therefore, the dry air contains the vaporized TPP. The TPP removing unit 65 removes the TPP contained in the dry air sent from the drying areas 2a-2c. The dry air in which the TPP is removed is fed to the fresh air feeding pipe 55 connected to the TPP removing unit 65. In the fresh air feeding pipe 55, outside air is taken from outside the pipe 55 by opening a valve (not shown), and the outside air and the dry air from the TPP removing unit 65 flow together as the fresh air.

As described above, since the fresh air blows toward the flapper 32 from the air outlet 56, it is prevented that the TPP is attached to the flapper 32, the attachment shaft 35 and the dry bearing 37. In addition, since the first and second covers 51,52 cover the frame 31 and the flapper 32 of the clip 10, it is further prevented that the dry air containing the TPP contacts the clip 10.

A method of producing the wet film 3 is described in followings. However, a method and an apparatus for the production as described below are examples, and the present invention is not restricted to the described below.

A cellulose acylate is used as a polymer in this embodiment, and it is preferable that a triacetyl cellulose (TAC) is used as the cellulose acylate. The TAC made from either of linter and pulp cotton is usable in the embodiment, but the one from the linter cotton is preferably used. In addition, the cellulose acylate, whose degree of the substitution satisfies all of following formulae (I) —(III), is more preferable. In these formulae, A is a degree of substitution of the hydrogen atom of the hydroxyl group to the acetyl group, and B is a degree of substitution of the hydrogen group to the acyl group having 3-22 carbon atoms. Preferably, at least 90 mass % of the cellulose acylate particles has diameter from 0.1 mm to 4 mm.

$$2.5 \leq A+B \leq 3.0 \quad (I)$$

$$0 \leq A \leq 3.0 \quad (II)$$

$$0 \leq B \leq 2.9 \quad (III)$$

Solvent compounds for preparing the dope are aromatic hydrocarbon (for example, benzene toluene and the like), halogenated hydrocarbons (for example, dichloromethane, chloroform, chlorobenzene and the like), alcohols (for example methanol, ethanol, n-propanol, n-butanol, diethylene glycol and the like), ketones (for example acetone, methylethyl ketone and the like), esters (for example, methylacetate, ethylacetate, propylacetate and the like), ethers (for example tetrahydrofuran, methylcellosolve and the like) and the like. Note that the dope means a polymer solution or a dispersed solution obtained by dissolving or dispersing the polymer in the solvent.

The preferable solvent compounds are the halogenated hydrocarbons having 1 to 7 carbon atoms, and dichloromethane is especially preferable. In view of physical properties such as optical properties, a solubility, a peelability from a support, a mechanical strength of the film and the like, it is preferable to use at least one sorts of the alcohols having 1 to 5 carbon atoms with dichloromethane. The content of the alcohols is preferably in the range of 2 mass % to 25 mass %, and especially in the range of 5 mass % to 20 mass % to total solvent compounds in the solvent. As concrete example of the alcohols, there are methanol, ethanol, n-propanol, isopropanol, n-butanol, and the like. It is preferable to use methanol, ethanol, n-butanol or a mixture thereof.

Recently, in order to reduce the influence on the environment, the solvent containing no dichloromethane is proposed. In this case, the solvent contains ethers with 4 to 12 carbon atoms, ketones with 3 to 12 carbon atoms, esters with 3 to 12 carbon atom, or a mixture of them. The ethers, ketones, esters may have a cyclic structure. At least one solvent compound having at least two functional groups thereof (—O—, —CO—, —COO—) may be contained in the organic solvent. Note that the organic solvent compound may have other functional group such as alcoholic hydroxy group.

The cellulose acylate is described in detail in Japanese patent laid-open publication No. 2005-104148, and the description of this application can be applied to the present invention. Further, as the solvent of cellulose acylate and other additives, this application discloses plasticizers, deteoriation inhibitor, optical anisotropy controlling agent, dye, matting agent, release agent and release promoter in detail.

[Method of Producing the Dope]

First, the dope is made from above raw materials. A dope producing apparatus 70, which is described in FIG. 8, comprises a solvent tank 71 for containing a solvent, a dissolving tank 73 for mixing the solvent and TAC, a hopper 74 for supplying the TAC and a additive tank 75 for storing the additives. The dope producing apparatus 70 further comprises a heater 86 for heating a swelling liquid described below, a temperature regulator 87 for regulating the temperature of the heated swelling liquid, filtration devices 88 and 95, a flushing device 91 for adjusting the concentration of the dope. In addition, the dope producing apparatus 70 comprises a recovering device 92 for recovering the solvent and a reproducing device 93 for reproducing the recovered solvent. The dope producing apparatus 70 is connected to a film producing apparatus 100 through a reserve tank 90.

In this embodiment, the dope is made in the dope producing apparatus 70 by a method in the followings. At first, the solvent is transported from the solvent tank 71 to the dissolving tank 73 by opening a valve 72. Next, the measured volume of TAC is transported from the hopper 74 to the dissolving tank 73, and the required volume of the additive liquid is transported from the additive tank 75 to the dissolving tank 73 by opening a valve 76.

There are other methods except for additives to be transported as the solution. For example, the additives can be directly transported into the dissolving tank 73 if additives are in liquid state at the normal temperature. The additives can be transported into the dissolving tank 73 by a hopper if the additive is in solid state. If plural kinds of additives are used, it can be that a solution dissolving all of them is stored in the additive tank 75, and it can be that each of solutions including single additive is stored in a separate additive tank and transported into the dissolving tank 73 through each corresponding pipe.

In the above embodiment, the order in which materials transported into the dissolving tank 73 is the solvent, the TAC and additives. However, the order is not restricted to this way. For example, after the TAC is transported into the dissolving tank 73, intended volume of the solvent can be transported. In addition, additives is not required to be preliminarily stored in the dissolving tank 73, but can be mixed into a mixture of the TAC and the solvent at the after process.

Figure 8:
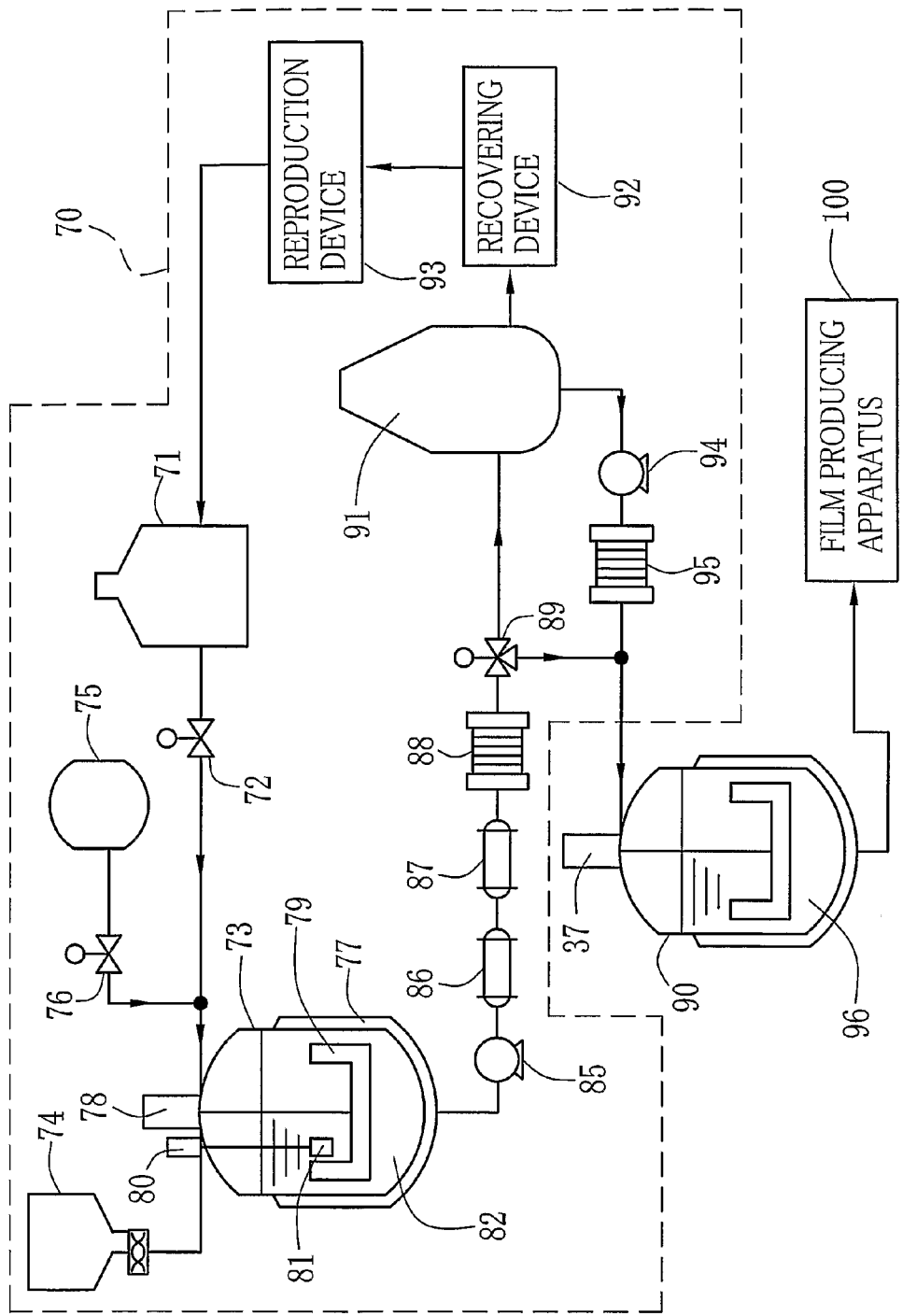
FIG. 8 is a schematic view of a dope producing apparatus.

The dissolving tank 73 comprises a jacket 77 which covers the outside of the tank 73 as shown in FIG. 8, and a first stirrer 79 rotated by a motor 78. Further, preferably the dissolving tank 73 comprises a second stirrer 81 rotated by a motor 80. Note that preferably the first stirrer 79 has a anchor blade and the second stirrer 81 is an eccentric stirrer of dissolver type. Temperature inside the dissolving tank 73 is regulated by a heating medium flowing in the jacket 77. The temperature is preferably in the range of −10° C. to 55° C. By individually controlling the rotation of the first stirrer 17 and the second stirrer 81, a swelling liquid 82 in which the TAC swells in the solvent is made.

Next, the swelling liquid 82 is transported to the heater 86 by a pump 85. Preferably, the heater 86 has a jacketed pipe and a pressure device for pressurizing inside the pipe. In the heater 86, solid contents in the swelling liquid 82 are dissolved in the solvent by being heated or by being heated and pressurized. Note that preferably temperature of the swelling liquid 82 is heated in a range of 50° C. to 120° C. (hereinafter this method is called the heating dissolution method). A known cooling dissolution method, in which the temperature of the swelling liquid 82 is cooled in a range of −100° C. to −30° C., is also applicable to obtain the dope. The heating and cooling dissolution methods are selected according to the properties of the TAC for the dissolving. A temperature of the dope is controlled to approximately room temperature by the temperature regulator 87, and then the dope is filtrated by the filtration device 88 so that impurities are removed from the dope. Preferably the average hole diameter of a filter in the filtration device 88 is less than 100 μm. Preferably flow rate of the filtration is equal to or more than 50 liter/hour. The dope after the filtration is stored in the reserve tank 90 through a valve 89.

The method stated above, that once the swelling liquid 82 is prepared and then making the dope from the swelling liquid 82, possibly needs high product cost, because longer manufacturing time is required to make the dope having higher concentration of the TAC. To reduce the cost, it is preferable that a dope having the TAC in lower concentration than a desired concentration is prepared, and then a concentration process is performed, in which the concentration of the TAC is elevated to the desired concentration. For the concentration process being applied to the dope, the dope filtrated in the filtration device 88 is transported into the flushing device 91 through the valve 89, so that a part of solvent in the dope is vaporized in the flushing device 91. The solvent vapor is condensed into liquid by a condenser (not shown). The liquid is recovered by the recovering device 92 and reproduced by the reproduction device 93 to be reused as the solvent for preparing the dope. This recycling process has an advantage in terms of cost.

The condensed dope 96 is drawn from the flushing device 91 out by a pump 94. Further, preferably air bubbles generated in the dope 96 are removed. Any known methods to remove the air bubble are applicable (for example, ultrasonic irradiation method). Next, the dope 96 is transported to the filtration device 35 in which impurities in the dope 96 are removed. Note that the temperature of the dope 96 when being applied these processes is preferable in a range of 0° C. to 200° C. The dope 96 is transported to and stored in the reserve tank 90. And the dope in the reserve tank 90 is transported into the film producing apparatus 100.

Preferably, the primary dope and the additive liquid (for example the UV-absorbing liquid) in transporting are mixed by an inline mixer (for example a static mixer). It is preferable that plural inline mixers each of which has a structure for the mixing different from the other mixer are serially connected.

Preferably, at least either the static mixer or a sulzer mixer is used as the inline mixer. When the static mixer is used, the mixer has preferably 6 to 90 elements, more preferably 6 to 60 elements.

In case that both the static mixer and the sulzer mixer are equipped as the inline mixer, the sulzer mixer is preferably disposed at a position upstream from the static mixer. Further, a distance between the sulzer mixer and an additive liquid inlet is preferably in a range of 5 mm to 150 mm, more preferably in a range of 5 mm to 15 mm. In addition, an upstream side edge of an element of the sulzer mixer is preferably disposed near an inner surface of the pipe in which the primary dope flows.

Preferably, a first filtration device for filtrating the primary dope is disposed at a position upstream from the inline mixer, and the additives are mixed into the dope filtrated by the first filtration device. In addition, it is preferable that a second filtration device for filtrating the dope is disposed at a position downstream from the inline mixer, and the dope mixed by the inline mixer is filtrated by the second filtration device.

Preferably, the embodiment is performed with satisfying following conditions.

(1) $1 \leq V1/V2 \leq 5$ when V1 is defined as a flow velocity of the additive liquid and V2 is defined as the flow velocity of the raw material liquid.

(2) a ratio of the additive liquid within the dope is in a range of 0.1% to 50% by rate of flow volume.

(3) $1000 \leq N2/N1 \leq 100000$, and at 20° C., $5000 \text{ cP} \leq N1 \leq 500000 \text{ cP}$ and $0.1 \text{ cP} \leq N2 \leq 100 \text{ cP}$ when N1 is defined as viscosity of the additive liquid and N2 is defined as viscosity of the primary dope.

(4) The shear speed of the dope is in a range of 0.1 (l/s) to 30 (l/s).

(5) The polymer is the cellulose acylate.

(6) The additive liquid is the solution containing the main solvent of the polymer solution.

(7) The additive liquid is the solution containing the main solvent of the polymer solution, and the composition of the additive liquid is different from the dope.

(8) The additive liquid is the solution including the main solvent of the polymer solution, and further including at least one kind of UV absorbing agent.

(9) The additive liquid is the solution including the main solvent of the polymer solution, and being made from dispersed particles of at least one kind of inorganic or organic material.

(10) The additive liquid is the solution including the main solvent of the polymer solution, and further including at least one kind of peeling promoter.

(11) The additive liquid is the solution including the main solvent of the polymer solution, and further including at least one-kind of poor solvent.

The TAC concentration is preferably in a range of 5 mass % to 40 mass %, especially in a range of 15 mass % to 30 mass %, particularly in a range of 17 mass % to 25 mass %. A concentration of the additives (mainly composed of the plasticizer) is preferably in the range of 1 mass % to 20 mass % to total solid components in the dope. Note that methods for adding and dissolving raw materials and additives of a dope, filtering the dope, removing bubbles, and other methods in the solution casting method for producing the TAC film are explained in Japanese Patent Laid-open publication No. 2005-104148. The content of this publication can be applied to the present invention.

[Solution Casting Method]

A method for producing film from the dope 96 is described later. However, the present invention is not restricted to be applied to the apparatus in FIG. 9. The film producing apparatus 100 comprises a filtration device 104, a casting die 110, a casting belt 113 supported by rollers 111, 112, and the tenter device 2. The film producing apparatus 100 further comprises the edge slitting device 142, a drying chamber 145, a cooling chamber 147 and a winding chamber 150.

A stirrer 102 rotated by a motor 101 is provided in the reserve tank 90. The reserve tank 90 is connected to the casting die 110 through a pump 103 and the filtration device 104.

As the material of the casting die 110, a precipitation hardened stainless or a stainless having double-phase structure is preferably used. The material has coefficient of thermal expansion of at most $2 \times 10^{-5}$ ($° C.^{-1}$), the almost same anti-corrosion properties as SUS316 in examination of corrosion in electrolyte aqua solution. Further, when the material was dipped in a mixture liquid of dichloromethane, methanol and water, pitting (holes) were not formed on the gas-liquid interface. The surface roughness of a contacting surface of the casting die 110 to the dope is at most 1 μm, straightness is at most 1 μm/m in each direction, and the clearance of the slit is automatically controlled in the range of 0.5 mm to 3.5 mm. An end of the contacting portion of each lip to the dope was processed so as to have a chamfered radius at most 50 μm through the slit. In the die, the shear speed is preferably in the range of 1 (1/sec) to 5000 (1/sec).

Preferably, a width of the casting die 110 is about 1.0 to 2.0 times larger than a width of the product film. Preferably, a device for regulating the temperature of the casting die is attached to the casting die 110 such that the casting is performed with the temperature of the casting die being kept in a predetermined range. Further, preferably the casting die 110 is coat hanger type, in which bolts (heat bolts) for automatically adjusting the thickness of the film are provided with predetermined intervals in the width direction of the casting die 110. The heat bolts preferably set a casting profile according to the flow volume from the pump 103 by a preset program. The casting profile can be also adjusted by a feedback control based on a measured value from a thickness measurement device (not shown) provided in the film production device 100 (for example, an infrared thickness measurement device). Thus, in the film except of the edge portions, the difference of the thickness at any two points apart is preferably at most 1 μm, and further the difference of the minimal thickness value and the maximal thickness value in the widthwise direction is preferably at most 3 μm, especially at most 2 μm. The variation of the lip clearance is preferably in a range of ±50 μm.

Further, lip ends are provided with a hardened layer. In order to provide the hardened layer, there are methods of ceramic coating, hard chrome plating, nitriding treatment and the like. If the ceramics is used as the hardened layer, the grind was possible, the porosity becomes lower, and was not friable and the good corrosion resistance. Further, as the preferable ceramics, there was no adhesive property to the dope. Concretely, as the ceramics, there are tungsten carbide, $Al_2O_3$, TiN, $Cr_2O_3$ and the like, and especially tungsten carbide. Note in the present invention the hardened layer is preferably formed by a tungsten carbide coating in a spraying method.

A device for supplying a solvent (not shown) is preferably provided on the both edges of a die slit in order to prevent the discharged dope partially dried to be a solid. Preferably, the solvent to which the dope was dissoluble (for example, a mixture solvent whose composition is dichloromethane 86.5 mass.pct, acetone 13 mass.pct, n-butanol 0.5 mass.pct) is supplied to each bead edge and the air-liquid interface of the slit. The pump for supplying the dope preferably has a pulsation at most 5%.

Below the casting die 110, there is the belt 113 supported by the rollers 111, 112. The belt 113 moves endlessly and circulatory in accordance with a rotation of the rollers 111 and 112 by a driving device (not shown). The moving speed of the belt 113, namely a casting speed is preferably in the range of 10 m/min to 200 m/min. Furthermore, the rollers 111,112 are connected to a heat transfer medium circulator 114 for keeping a surface temperature of the belt 113 to a predetermined value. In each roller 111,112, there is a heat transfer passage in which a heat transfer medium of the predetermined temperature is fed, so as to keep the temperature of the rollers 111,112 to the predetermined value. Thus the surface temperature of the belt 113 is controlled to the predetermined value. Note that the surface temperature is preferably from −20° C. to 40° C.

The rollers 111, 112 are also usable as the support itself. In this case, preferably the rollers rotates with a high accuracy that the deviation of the rotational velocity is at most 0.2%. Preferably a surface roughness of a contacting surface of each of the rollers 111, 112 was at most 0.01 μm. The surface of the each rollers 111, 112 are processed by the hard chrome plating so as to have the enough hardness and durability. Note that the support (the belt 113 or the roller 111, 112) preferably had minimum defect on the surface thereof. Preferably, the number of pinholes whose diameter is at least 30 μm is zero, that of the pinholes whose diameter is at least 10 μm and at most 30 μm is at most 1 per 1 $m^2$, and that of the pinholes whose diameter is less than 10 μm is at most 2 per 1 $m^2$.

The casting die 110, the belt 113 and the like are contained in a casting chamber 115. In the casting chamber 115, a temperature regulator 116 to regulate the temperature inside the chamber and a first condenser 117 to condense a vaporized organic solvent is provided. A recovering device 118 to recover the condensed organic solvent is provided outside of the casting chamber 115. Preferably, a decompression chamber 120 is provided in the casting chamber 115 in order to control a pressure at the backside of a casting bead formed between the casting die 110 and the belt 113.

Air blowers 121,122,123 for feeding a drying air onto the casting film 119 is provided so that the organic solvent may evaporate from the casting film 79. Positions of the air blowers are an upper and upstream side, an upper and downstream side, and a lower side of the belt 113. However, the positions are not restricted in this figure. The surface condition of the film sometimes changes when the drying air is applied onto the casting film 119 just after the formation thereof. In order to reduce the change of the surface condition, a wind shielding device 124 is preferably provided.

An air blower 131 is provided in an interval section 130, and a crasher 143 is provided in an edge slitting device 142 in a position downstream from the tenter device 2. The crasher 143 crushes cut both edges of the film 141 into fragments (tips).

Figure 9:
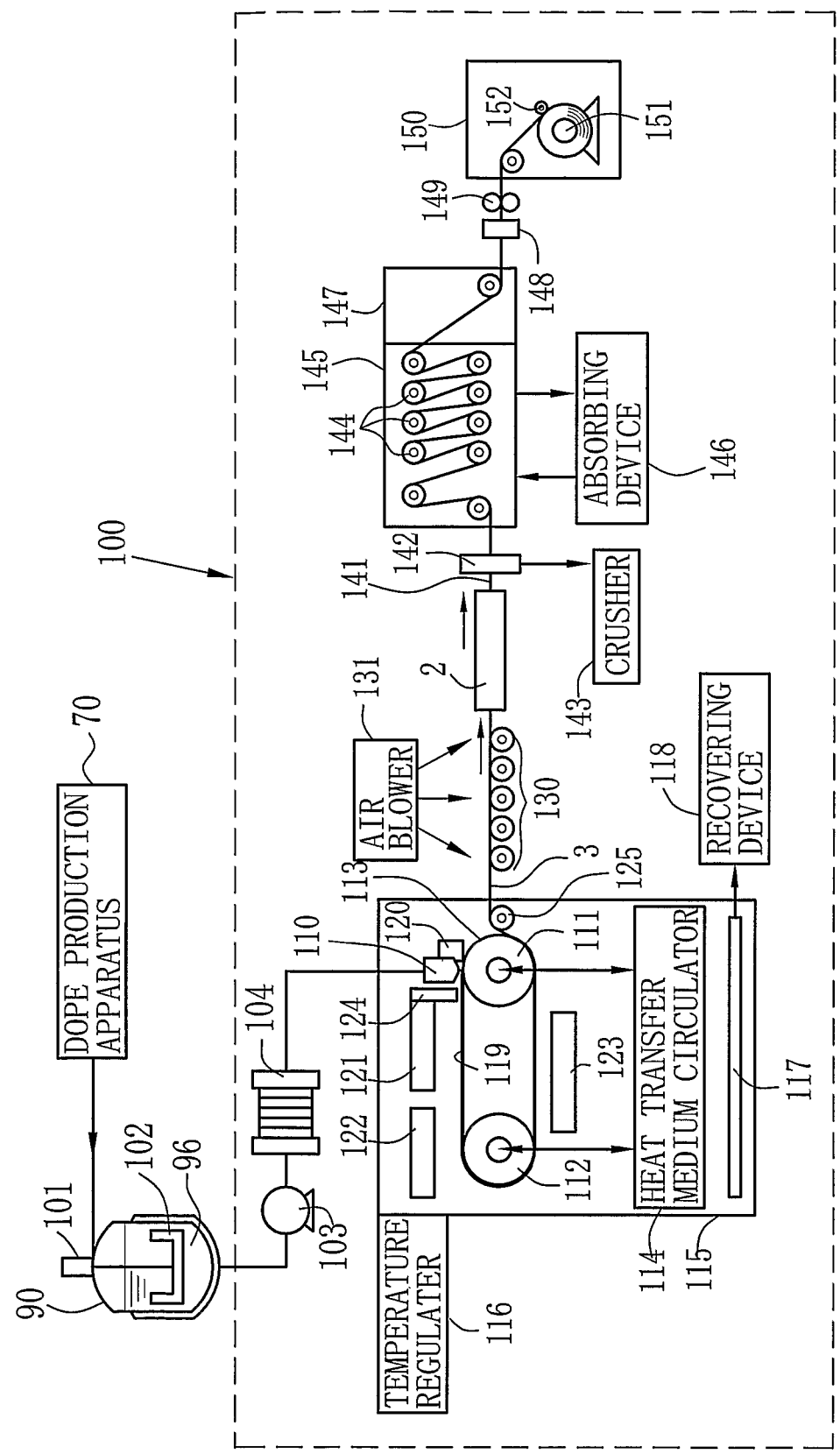
FIG. 9 is a schematic view of an apparatus for producing a film by solution casting.

There are plural rollers 144 in the drying chamber 145. A recovering device 146 for adsorbing and recovering the solvent vapor is connected to the drying chamber 145. In FIG. 9, a cooling chamber 147 is provided in a position downstream from the drying chamber 145. A moisture control chamber (not shown) may be provided between the drying chamber 145 and the cooling chamber 147. In a position downstream from the cooling chamber 147, a compulsory neutralization device (neutralization bar) 148 is provided such that the charged voltage on the film 141 may be in the range of −3 kV to +3 kV. However, the position of the neutralization device 148 is not restricted in FIG. 9. Further, a knurling roller 149 for providing a knurling with an embossing processing in the both edges of the film 141 is provided in a position downstream from the compulsory neutralization device 148. And, a winding roller 151 to wind the film 141 and a press roller 152 to control the tension on the film in winding are provided inside the winding chamber 150.

An example of the method for producing the film in the film producing apparatus 100 will be described in the followings. The dope 96 is consistently uniformed by being stirred with the stirrer 112. The additives (plasticizer, UV-absorbing agent and the like) can be mixed in the dope 96 while the stirring.

The dope 96 is transported by the pump 103 to the filtration device 104 in which the dope 96 is filtrated, and is cast from the casting die 110 to the belt 113. A tension on the belt 113 is preferably regulated in a range $10^4$ N/m to $10^5$ N/m by the drive of two rollers 111,112. The difference of the relative speed of the rollers 111,112 and the belt 113 is preferably at most 0.01 m/min. Further, the fluctuation of the velocity of the belt 113 is preferably at most 0.5%. The length of film meandering in width direction generated by one rotation is preferably at most 1.5 mm. The rotation is preferably regulated by feedback from a detecting device (not shown) which detects the positions of both edges of the belt 113, in order to reduce the film meandering. Further, preferably the positional fluctuation in horizontal directions of the lips and the belt 113 just below the casting die 110, which is generated in the rotation of the roller 111 is regulated to at most 200 μm. In addition, the temperature in the casting chamber 115 is preferably in the range of −10° C. to 57° C. The solvent vapor from inside the casting chamber 115 is recovered by the recovering device 78, and is reproduced for being reused as the solvent for preparing the dope.

The casting die 110 casts the casting dope on the belt 113 to form the casting film 119, while the casting dope form the bead above the belt 113. Note that the temperature of the casting dope is preferably from −10° C. to 57° C. Further, in order to stabilize the formation of the bead, the decompression chamber 120 is preferably provided to control a pressure on a rear side of the bead. Preferably, the pressure on the rear side of the bead is decompressed in the range of −10 Pa to −1500 Pa from the pressure of a front side of the bead. Further, preferably the temperature inside the chamber 120 is regulated by a jacket attached to the chamber 120 so as to keep the predetermined temperature. Preferably an suctioning device (not shown) is provided at the edge portions of the casting die 110 to keep the desired form of the casting bead. Preferably volume of the suction is in a range of 1 L/min to 100 L/min.

After having a self-supporting property, the casting film 119 is peeled as a wet film 3 from the belt 113 with support of a peel roller 125. At that time, the content of the remaining solvent is preferably in a range of 20 mass % to 250 mass % to total solid components in the film. Thereafter, the wet film 3 is transported to the tenter device 2 through the interval section 130 provided with plural rollers. In the interval section 130, a drying air at a predetermined temperature is fed from the air blower 131 such that the drying of the wet film 3 may proceed. The temperature of the drying air is preferably in the range of 20° C. to 250° C.

The wet film 3 is dried while transported in the tenter device 2, with portions thereof are held by clips. In the tenter device 2, the wet film 3 is stretched in the width direction B (see FIG. 1). The wet film 3 is preferably stretched in the range of 100.5% to 300% at least whether width or casting direction in whether the interval section 130 or the tenter device 2.

The wet film 3 becomes the film 141 containing a predetermined content of the solvent in the tenter device 2. Then the film 141 is transported into the edge slitting device 142 for slitting off both edge portions of the film 141. The slit edge portions are conveyed to the crusher 143 with use of a cutter blower (not shown). The crusher 143 crushes the both edge portions into tips, which are reused for preparation of the dope in view of the cost. Note that the slitting off the both edge portions of the film may be omitted. However, it is preferable to slit them off somewhere between the casting of the dope and the winding the film.

The film 141 is transported into the drying chamber 145 so as to be dried further. The temperature in the drying chamber 141 is not restricted especially. The drying of the film 141 in the drying chamber 145 is made with wrapping around the pass roller 144 so as to evaporate the solvent. The solvent vapor is adsorbed and recovered by the recovering device 146. The air from which the solvent vapor is removed is sent as the drying air again. Note that the drying chamber 145 is preferably partitioned into plural partitions so as to vary the drying temperature. Further, it is preferable to provide a pre-drying chamber (not shown) between the edge slitting device 142 and the drying chamber 145 so as to make the pre-drying of the film 141. In this case, the deformation of the film which is caused by the accelerate increase of the temperature of the film is prevented.

The film 141 is transported into the cooling chamber 147, and cooled to an approximately room temperature. Note that a moisture control chamber (not shown) may be provided between the drying chamber 145 and the cooling chamber 147. In the moisture control chamber, an air whose moisture and temperature are controlled is fed toward the film 141. Thus a winding defect and a curl of the film are prevented when the film 141 is wound.

In the solution casting method, the peeled film (polymer film) before wound up is applied various processes including the drying process and a process of cutting side edge portions of the film. While being applied these processes, the polymer film is supported and fed by rollers. As the rollers, there are drive rollers and non-drive rollers. The non-drive roller is used for determining a feeding path of the polymer film and increasing a stability of feeding.

The drive roller is used for transmitting the driving force to the polymer film so as to feed it downstream. As the drive roller, a suction roller is usually used. While feeding of the film, different film tensions may be required in the different processes, such as the casting process, the peeling process, the drying process and the winding process. In this case, the suction roller applies the driving force to the film so as to change the film tension. The suction roller has a plurality of suction holes on a contact surface thereof so as to suck the polymer film thereon while the feeding.

When the suction roller is used for feeding the film, since a complex power whose direction cannot identify acts on the film, the film is likely to be deformed. Further, the film can be deformed by the difference of the film tensions between upstream and downstream from the suction roller. In addition, when the polymer film slips, contracts or becomes deformed while contacting on edges of the suction holes, microscopic flaws are occurred on the film.

The surface of the driving roller used in the transporting process is hardened. The hardening may be performed by hard chrome plating, nitridation, quenching or the like. The degree of hardness is in a range of 500 to 2000, preferably in a range of 800 to 1200 in Vickers hardness.

The drive roller is a suction roller 65 having a plurality of suction holes 91 on its surface. The surface roughness Ry of the roller surface 65*a* is preferably in a range of 0.3 μm to 1.0 μm, particularly in a range of 0.5 μm to 0.8 μm. The value of the surface roughness Ry is measured in area of the roller surface without the suction hole. A diameter of the suction hole is preferably in a range of 1 mm to 6 mm, particularly in a range of 2 mm to 4 mm. A width of chamfer of the suction hole is preferably in a range of 2% to 20% in ratio to the diameter thereof.

While the suction roller is driven, it is preferable that a surface temperature thereof is controlled. For this purpose, at least one roller temperature controller, which corresponds to the single suction roller, is preferably provided. It is preferable that the roller temperature controller controls the surface temperature of the suction roller so as to be higher than temperature of the film immediately before contacting to the suction roller.

By the compulsory neutralization device (neutralization bar) 148, charged voltage on the film 141 is regulated in the range of −3 kV to +3 kV in the transporting. In FIG. 9, the neutralization device 148 is disposed in a position downstream from the cooling chamber 147. However, the position of the neutralization device 148 is not restricted in this figure. Further, it is preferable to provide a knurling roller 149 for providing a knurling with an embossing processing. Note that the unevenness in the area in which the knurling is provided is preferably in the range of 1 μm to 200 μm.

At last, the film 141 is wound around the winding shaft 151 in the winding chamber 150. The winding is preferably made with applying a predetermined tension by the press roller 152, and it is preferable to change the tension from a start to an end of the winding little by little. The length of the film 141 to be wound is preferably at least 100 m, and a width thereof is preferably at least 600 mm, and especially from 1400 mm to 1800 mm. However, even if the width is more than 1800 mm, the present invention is effective. Further, in the present invention, the thickness of the film to be produced is in the range of 15 μm to 100 μm.

The solution casting method of the present invention may be a co-casting method in which a co-casting of two or more sorts of the dopes are made such that the dopes may form a multi-layer film, or a sequentially casting method in which two or more sorts of the dopes are sequentially cast so as to form the multi-layer film. When the co-casting is performed, a feed block may be attached to the casting die, or a multi-manifold type casting die may be used. A thickness of whether upper or lowermost layer of the multi-layer casting film on the support is preferably in the range of 0.5% to 30% to the total thickness of the multi-layer casting film. Furthermore, in the co-casting method, when the dopes are cast onto the support, it is preferable that the lower viscosity dope may entirely cover over the higher viscosity dope. Furthermore, in the co-casing method, it is preferable that the inner dope is covered with dopes whose alcohol contents are larger in the bead from a die to the support.

Note that the laid-open publication No. 2005-104148 teaches in detail the structure of the casting die and the support, drying conditions in each processes (such as the co-casting, the peeling and the stretching), a handling method, a winding method after the correction of planarity and curling, a recovering method of the solvent, a recovering method of film and the like. The description of the above publication may be applied to the present invention.

[Characteristics, Measuring Method]

The laid-open publication No. 2005-104148 teaches the characteristics and the measuring method of the cellulose acylate film, which may be applied to the present invention.

[Surface Treatment]

It is preferable to make a surface treatment of at least one surface of the cellulose acylate film. Preferably, the surface treatment is at least one of glow discharge treatment, atmospheric pressure plasma discharge treatment, UV radiation treatment, corona discharge treatment, flame treatment, and acid or alkali treatment.

[Functional Layer]

A primary coating may be made over at least one surface of the cellulose acylate film. Further, it is preferable to provide other functional layers for the cellulose acylate film as a film base so as to obtain a functional material. The functional layers may be at least one of antistatic agent, cured resin layer, antireflection layer, adhesive layer for easy adhesion, antiglare layer and an optical compensation layer.

Conditions and methods of performing a surface treatment and providing a functional layer with several functions and characteristics are described in the laid-open publication No. 2005-104148.

[Application]

The cellulose acylate film can be used as the protective film in a polarizing filter. To obtain a LCD, two polarizing filters, in each of which the cellulose acylate film is adhered to a polarizer, are disposed so as to sandwich a liquid crystal layer. The laid-open publication No. 2005-104148 discloses TN type, STN type, VA type, OCB type, reflection type, and other example in detail. To these types can be applied the film of the present invention. Further, the application teaches the cellulose acylate film provided with an optical anisotropic layer and that provided with antireflective and antiglare functions. Furthermore, the application supposes to provide the cellulose acylate film with adequate optical functions, and thus a biaxial cellulose acylate film is obtained and used as the optical compensation film, which can be used as the protective film in the polarizing filter simultaneously. The restriction thereof described in the laid-open publication No. 2005-104148 can be applied to the present invention.

In addition, a cellulose triacetate film (TAC film) having superior optical characteristics can be obtained according to the present invention. The TAC film can be used as a base film of a photosensitive material or a protective film in a polarizing filter. The TAC film is also used as an optical compensation film for widening a view angle of a liquid crystal display used for a TV monitor. In this case, preferably the TAC film also has the function of the protective film in the polarizing filter. Accordingly, the TAC film can be used for an IPS (In-Plane Switching) mode, an OCB (Optionally Compensatory Bend) mode, a VA (Vertically Aligned) mode and the like as well as for a conventional TN (Twisted Nematic) mode.

EXAMPLE 1

As the dry bearing 37, it was prepared five materials, which were the DAIDAYNE DDK01 of DAIDO METAL Corp. used in the above embodiment, and samples A to D. The DDK01 contains polytetrafluoroethylene (PTFE) and solid lubricant. The sample A was DAIDAYNE DDU01 of DAIDO METAL Corp., which is used for conventional dry bearing, including PTFE, lead and solid lubricant. The sample B was DTK52 of DAIDO METAL Corp. including polyether ether ketone (PEEK). The sample C was AURAM® JCF3030 of MITSUI CHEMICALS, INC. including polyimide resin, carbon fiber and PTFE. The sample D was POLYPENCO® PEEK PK-450 of NIPPON POLYPENCO LIMITED including PEEK. Note that the DDK01 and the samples B to D are lead-free.

To evaluate dust generation from each of the materials, inner peripheral surface of the dry bearing 37 of the each material was rubbed by a black paper, and an amount of dust on the black paper transferred from the dry bearing 37 was measured. In addition, a durability test was performed to evaluate durability of the flapper 32 using the dry bearing 37 of the each material. In the durability test, while the five clips 10 incorporating the dry bearings 37 of the respective materials were in an oven heated to 150° C., the flapper 32 of the each clip 10 was continuously performed switching movement with weighted by a cylinder. The durability test was respectively performed in a fresh air atmosphere and a TPP atmosphere.

Results of the tests are shown in Table 1. In Table 1, the evaluation of the dust generation was made as follows:

"G" (Good) when the number of particles on the black paper was 0 to 2;

"P" (Pass) when the number of particles on the black paper was 3 to 9;

"R" (Reject) when the number of particles on the black paper was more than 9.

In addition, the evaluation of the durability of the flapper was made as follows:

"G" (Good) when the switching movement of the flapper 32 could be continued at least 445000 times;

"P" (Pass) when the switching movement of the flapper 32 could be continued 3001 to 444999 times;

"R" (Reject) when the switching movement of the flapper 32 could be continued at most 3000 times.

TABLE 1

| material of bearing | number of particles | durability of flapper in fresh air | durability of flapper in TPP |
|---|---|---|---|
| DDK01 | P | G | G |
| sample A (DDU01) | R | G | R |
| sample B (DTK52) | P | G | G |
| sample C (JCF3030) | P | G | P |
| sample D (PK-450) | P | G | G |

When the DDK01, the sample B or the sample D was the material of the dry bearing 37, the number of the particles was small (3 to 9), and the switching movement of the flapper 32 could be continued at least 445000 times both in the fresh air atmosphere and in the TPP atmosphere. When the sample C was the material of the dry bearing 37, the number of the particles was small (3 to 9), and the switching movement of the flapper 32 could be continued 3001 to 444999 times in the TPP atmosphere, at least 445000 times in the fresh air atmosphere. When the sample A was the material of the dry bearing 37, the number of the particles was large (at least 10), and the switching movement of the flapper 32 could be continued at most 3000 times in the TPP atmosphere, at least 445000 times in the fresh air atmosphere. Note that the flapper 32 switches approximately 445000 times while the tenter device 2 is operated for a year.

The results shows that the durability of the flapper 32 is improved when the dry bearing 37 is formed from materials which generate low dust and is lead-free. According to that, it is prevented that the wet film 3 is misheld by defective movement of the flapper 32 caused by degradation of the dry bearing 37. In addition, when the clip 10 is operated in the fresh air atmosphere, the defective movement of the flapper 32 can be avoided more effectively, because it is prevented that the TPP is attached to the dry bearing 37 and which causes a binding between the particles on the dry bearing 37 and the TPP to form mass.

EXAMPLE 2

Example of the film production of the present invention will be explained. The composition of the polymer solution (the dope) used in the process for producing the film is shown below.

| [composition] | |
|---|---|
| Cellulose triacetate (substitution degree of acetyl group was 2.84, viscometric average degree of polymerization was 306, moisture content was 0.2 mass. %, viscosity of 6% by mass of dichloromethane solution was 315 mPa · s, powder whose average of particle diameter was 1.5 mm and standard deviation was 0.5 mm) | 100 mass. pct |
| Dichloromethane (first solvent) | 320 mass. pct |
| Methanol (second solvent) | 83 mass. pct |
| 1-butanol (third solvent) | 3 mass. pct |
| Plasticizer A (TPP) | 7.6 mass. pct |
| Plasticizer B (Diphenylphosphate) | 3.8 mass. pct |
| UV-absorbing agent a: 2-(2'-hydroxy-3',5'-di-tert-butylphenyl)benzotriazol | 0.7 mass. pct |
| UV-absorbing agent b: 2-(2'-hydroxy-3',5'-di-tert-amylphenyl)-5-chlorobenzotriazole | 0.3 mass. pct |
| citric acid ester mixture: (citric acid, citric acid monoethylester, citric acid dietylester, citric acid trietylester) | 0.006 mass. pct |
| Particles: (silicon dioxide having a diameter of 15 nm, and Mohs hardness of approximate 7) | 0.05 mass. pct |

[Cellulose Triacetate]

Note that in the cellulose triacetate used in the example, content of remaining acetic acid was less than 0.1 mass. %, content of Ca was 58 ppm, content of Mg was 42 ppm, content of Fe was 0.5 ppm, content of free acetic acid was 40 ppm, and content of ion sulfate was 15 ppm. Degree of acetyl at $6^{th}$ position was 0.91 and that content was 32.5% of all acetyl and content extract from TAC by the acetone was 8 mass. %. A ratio of the average of molecular weight by weight to the average of molecular weight by number was 2.5. And yellow index of the obtained TAC was 1.7, haze was 0.08 and transparency was 93.5%. Tg (glass transition point measured by DSC) was 160° C. and calorific value in crystallization was 6.4 J/g. This was called cotton material TAC in below description.

(1-1) Dope Preparation

The dope 96 was prepared by the dope producing apparatus 70 in FIG. 8. In the stainless dissolving tank 73 with volume 4000 L which has the stirring blade, the plural solvents were mixed and stirred so as to be the mixture solvent. Note that each of those solvents has at most 0.5 mass. % of moisture content. Flake powder of the TAC was gradually added into the dissolving tank 73 from the hopper 74. The Powder of the TAC was dispersed in the dissolving tank 13 for thirty minutes by the first stirrer 79 having the anchor blade and the second stirrer 81 which is the eccentric stirrer of dissolver type. Temperature at start of the dispersion was 25° C., and that at the end of the dispersion was 48° C. Further, the prepared additive solution in the additive tank 75 was transported into the dissolving tank 73 with volume regulated by the valve 76. A weight of the content including the additive solution in the dissolving tank was 2000 kg. After finishing the dispersion of the additive solution, the additive solution was further stirred for 100 minutes by the first stirrer with predetermined rotation velocity, so that the TAC flake was swollen to be the swelling liquid 82. Inside of the tank was pressurized to 0.12 MPa with nitrogen gas until the swelling. At this time the oxygen concentration inside the dissolving tank 73 was kept less than 2 vol %, therefore it was no possibility of explosion. And the content of the water was 0.3 mass. % in the swelling liquid.

(1-2) Dissolution and Filtration

The swelling liquid 82 was transported by the pump 85 from the dissolving tank 73 to the heater 86 having the jacketed pipe. The swelling liquid was heated to 50° C. at first in the heater 86, and then heated to 90° C. under the pressure of 2 MPa, so as to be dissolved completely. At this time, the heating time was 15 minutes. Next, the temperature of the dissolved solution became 36° C. in the temperature regulator 87, and the solution was filtrated by the filtration device 88 with a filter whose nominal pore diameter was 8 μm. Accordingly, a low concentration dope was obtained. At this time, a pressure at the primary side was 1.5 MPa and a pressure at the secondary side was 1.2 MPa in the filtration device 88. As the material of the filter, the housing and the pipe, which reach to high temperature, HASTELLOY alloy having excellent anti-corrosion property was used. In addition, the jacket in which the heat transfer medium passes through was attached to the filter, the housing and the pipe.

(1-3) Condense, Filtration, Removal of Foams, Additives

The low concentration dope obtained in this way was flushed in the flashing device 91 under normal pressure and at the temperature of 80° C., and the vaporized solvent was condensed and recovered by the condenser. According to that, the dope of desired concentration was obtained. The condensed solvent was transported to the solvent tank 71 after recovered for reuse in the recovering device 92 and reproduced in the reproducing device 93. Distillation, dehydration and the like was performed in the recovering device 92 and the reproducing device 93. A stirrer having an anchor blade on a stirring shaft was provided inside the flashing tank such that foams in the flashed dope were removed by stirring. The dope in the flash tank is at the temperature of 25° C., and the average residence time of the dope in the tank was 50 minutes. A shear viscosity of the dope measured at the temperature of 25° C. was 450 Pa·s when a shear velocity was 10 (sec$^{-1}$).

After that, the dope was exposed to ultrasonic waves such that the foams in the dope was removed. Next, the dope passed through the filtration device 95 while being pressurized to 1.5 MPa by a pump. In the filtration device 95, the dope firstly passed through a metal sintered filter whose nominal pore diameter is 10 μm and secondly passed through a sintered filter whose nominal pore diameter is also 10 μm. The primary side pressures at each filtration were 1.5 MPa and 1.2 MPa, and the secondary pressures at each filtration were 1.0 MPa and 0.8 MPa. After the filtration, the dope 96 was transported and stored into a stainless stock tank with volume of 2000 L while the temperature thereof was regulated to 36° C. The stock tank comprised a stirrer which has an anchor blade on a central rotating shaft, so as to continuously stir the content in the stock tank. Further, no corrosion and the like happened in portions of the devices for preparing the dope 96 from the low concentration dope, where the dope contacts.

In addition, a mixture solvent A including dichloromethane (86.5 pts.mass), acetone (13 pts.mass) and 1-butanol (0.5 pts.mass) was made.

(1-4) Discharge, Casting, Bead Decompression

The film 141 was produced in the film producing apparatus 100 as shown in FIG. 9. The dope 96 in the reserve tank 90 was transported into the filtration device 104 by a pump 103. The pump 103 has a function to boost a pressure in the primary side thereof. The pressure in the primary side was controlled to 0.8 MPa by feedback for the upstream side of the pump 103. The volume efficiency of the pump 15 was 99.2%. And the fluctuation of the volume of discharge was at most 0.5%. The pressure of discharge was 1.5 MPa. The dope 96 passed through the filtration device 104 was transported to the casting die 110.

The casting die 110 to be used was 1.8 m in width. The casting was made with regulating a flow rate of the dope from the casting die 110, such that the thickness of the produced film 141 might be 80 μm and the width of the casting might be 1700 mm. In order to regulate the temperature of the dope 96 to 36° C., a jacket (not shown) is provided with the casting die 110, and a heat transfer medium whose temperature was controlled to 36° C. at an entrance of the jacket was fed into the jacket.

Temperature of the casting die 110 and pipes for was controlled to 36° C. while operating. The casting die 110 was coathanger type, in which the bolts (the heat bolts) for adjusting the thickness of the film were provided. Each pitch of bolts was 20 mm. The casting die 110 automatically regulate the thickness of the film 141 by the heat bolts. The heat bolts preferably set the casting profile according to the flow volume from the pump 103 by the preset program. The casting profile was adjusted by the feedback control based on the measured value from the infrared thickness measurement device (not shown) provided in the film production device 100. Thus, in the film except of the edge portions, the difference of the thickness at any two points 50 mm apart is preferably at most 1 μm, and further the difference of the minimal thickness value and the maximal thickness value in the widthwise direction is preferably at most 3 μm. The adjustment was made such that the change of the film thickness might be reduced in the range of ±1.5% to the averaged film thickness.

In a primary side from the casting die 110, the decompression chamber 120 was disposed, whose decompression value can be adjustable depending on the casting speed, such that there would be a pressure difference in the range of 1 Pa to 500 Pa between up- and downstream sides from the bead (from the casting die to the casting belt 113). The pressure difference was set such that the bead became predetermined length. Further, the temperature of the decompression chamber was also regulated to be higher than a condensation temperature of the gas around the casting bead. There was labyrinth packing (not shown) on the lips of the die 110 in front and rear sides of the bead. Further, there were openings in both sides. Further, in order to compensate the disorder of the both edges of the casting beads, the edge suctioning device (not shown) was used.

(1-5) Casting Die

The material of the casting die 110 was the stainless having double-phase structure. The material had coefficient of thermal expansion of at most $2\times10^{-5}$ (° C.$^{-1}$), the almost same anti-corrosion properties as SUS316 in examination of corrosion in electrolyte aqua solution. Further, when the material was dipped in a mixture liquid of dichloromethane, methanol and water, pitting (holes) were not formed on the gas-liquid interface. The surface roughness Ry of a contacting surface of the casting die 110 to the dope was at most 1 μm, a straightness was at most 1 μm/m in each direction, and the clearance of the slit was controlled to 1.5 mm. The end of the contacting portion of each lip to the dope was processed so as to have the chamfered radius at most 50 μm through the slit. In the die, the shearing speed was in the range of 1 (1/sec) to 5000 (1/sec). On the lip ends of the casting die 110, the hardened layer was formed by the tungsten carbide coating in the spraying method.

On the both side edges of the die slit, the discharged dope is partially dried to be a solid. In order to prevent the solidification of the dope, the mixture solvent A to which the dope was dissoluble was supplied at 0.5 ml/min to each bead edge and the air-liquid interface of the slit. The pump for supplying the dope has a pulsation at most 5%. Further, the pressure in the rear side (or the upstream side) of the bead was decreased by 150 Pa. Further, in order to make the temperature in the decompression chamber 120 constant, the jacket (not shown) was provided. Into the jacket, the heat transfer medium whose temperature was regulated to 35° C. was fed. The airflow of the edge suctioning was in the range of 1 L/min to 100 L/min, and in this embodiment, the air flow rate was regulated in the range of 30 L/min to 40 L/min.

(1-6) Material Support

The belt 113 was a stainless endless belt that was 2.1 m in width and 70 m in length. The thickness of the belt 113 was 1.5 mm and the polishment was made such that a surface roughness was at most 0.05 μm. The material was SUS 316 and had enough corrosion resistance and strength. The thickness unevenness of the belt 113 was at most 0.5%. The belt 113 was rotated by drive of the two rollers 111,112. At this time, the tension of the belt 113 was regulated to $1.5\times10^5$ N/m$^2$, and the difference of the relative speed of the rollers 111, 112 and the belt 113 was at most 0.01 m/min. Further, the velocity fluctuation of the belt 113 was at most 0.5%. The rotation was regulated with detecting the positions of both edges such that the film meandering in width direction for one rotation might be regulated to at most 1.5 mm. Further, the positional fluctuation in the horizontal direction of the lips of the casting die 110 and the belt 113 at just below the casting die 110 was at most 200 μm. The belt 113 is provided in the casting chamber 115 with a device to control the fluctuation of the airflow pressure (not shown).

Into the rollers 111, 112 are fed the heat transfer medium so as to perform the temperature regulation of the belt 113. Into the roller 111 in a side of the casting die 110 was fed the heat transfer medium (liquid) at 5° C. and into the roller 112 was fed the heat transfer medium (liquid) at 40° C. The surface temperature of the middle portion of the belt 113 just before the casting was 15° C., and the temperature difference between both side edges was at most 6° C. Note that the belt 113 preferably had no defect on surface, and especially preferably, the number of pinholes whose diameter was at least 30 μm was zero, that of the pinholes whose diameter was from 10 μm to 30 μm was at most 1 per 1 m$^2$, and that of the pinholes whose diameter was less than 10 μm was at most 2 per 1 m$^2$.

(1-7) Casting and Drying

The temperature of the casting chamber 115 was kept to 35° C. by the temperature regulator 116. The dope is cast onto the belt 113 to form the casting film 119, to which the drying air of parallel flow to the casting film 119 was fed from the air blowers 121, 122 at first to dry. An overall coefficient of heat transfer between the drying air and the casting film was 24 kcal/(m$^2$·hr·° C.). The temperature of the drying air was 135° C. in the upper and upstream side, 140° C. in the upper and downstream side of the belt 113. And the temperature of the drying air from the air blower 123 was 65° C. in the lower side of the belt 113. The saturated temperature of each drying wind was about −8° C. The oxygen concentration in the dry atmosphere was held at 5 volume %. Note that the displacement of air to Nitrogen gas was made so as to keep this oxygen concentration at 5 volume %. And in order to recover the solvent in the casting chamber 75 by condensing, the condenser 117 was provided and the temperature at the exit of the casting chamber 115 was set to −10° C.

A wind shielding device 124 was provided in the casting chamber such that the drying air did not directly apply to the dope 96 and the casting film 119 for five seconds from start of the casting, so as to reduce the fluctuation of the static pressure to at most ±1 Pa. When the ratio of solvent in the solution casting film 119 reached to 50 mass. % (dry measure basis), the solution casting film 119 was peeled as the wet film 3 from the casting belt 113 supported by the peeling roller 125. Note that the content of the solvent (dry measure basis) was calculated on a following formula:

Content of Solvent=$\{(x-y)/y\}\times 100$ x: weight of a sampling film before the drying y: weight of the sampling film after the drying At this time, a tension on the wet film 3 was regulated to $1\times10^2$ N/m$^2$, and the ratio of velocity of the peeling to that of the running belt 113 was regulated in the range of 100.1% to 110%. The surface temperature of the peeled film 3 was 15° C. An average speed of the drying of the solvent in the casting film 119 on the casting belt 113 was 60 mass. % (dry measure basis)/min. The solvent gas generated in the drying was condensed and liquefied by the condenser where a temperature was −10° C. and recovered by the recovering device (not shown). Water content in the recovered solvent was regulated to at most 0.5%. The dried air in which the solvent was removed was heated again and reused as the drying air. The wet film 3 was transported into the tenter device 2 through the interval section 130. In this transporting, the drying air (40° C.) was fed to the wet film 3 from the air blower 131. Note that the predetermined tension was applied to the wet film 3 while the wet film 3 was transported by the rollers in the interval section 130.

(1-8) Transporting in Tenter Device, Drying, Slitting

The wet film 3 was transported through the tenter device 2 with the both side edge portions of the film 3 were held by clips 10. In this time, the wet film 3 was dried by air. Then the dry air inside the drying areas 2a-2c, which contains the vaporized TPP is send to the TPP removing unit 65. The TPP removing unit 65 removes the TPP contained in the dry air. The dry air in which the TPP is removed is fed to the fresh air feeding pipe 55 connected to the TPP removing unit 65. In the fresh air feeding pipe 55, outside air is taken from outside the pipe by opening the valve (not shown), and the outside air and the dry air from the TPP removing unit 65 flow together as the fresh air at the flow rate regulated by the valve 62. The fresh air through the fresh air feeding pipe 55 blows from the air outlets 56 provided in the first and second clip covers 51,52 toward the clip 10, mainly toward the flapper 32. A fluctuation of velocity of the sprockets 11,12 were at most 0.5%. The gaseous composition of the drying air was the same as that in the saturated gas at the temperature of −10° C. An average speed of the drying of the solvent in the wet film 3 in the tenter device 2 was 120 mass. % (dry measure basis)/min. The condition in the drying zone was regulated such that the content of the remaining solvent at the exit of the tenter device 2 was 7 mass. %. The wet film 3 was transported in tenter device 2 with being stretched in the width direction B (see FIG. 1). Note that when the width of the wet film 3 before being stretched was 100%, that of the stretched film 3 was 103%. The stretching ratio of the film from the peeling roller 125 to the entrance of the tenter device 2 was 102%. A ratio of the length between the position where the clips 10 started holding film and the position where the clips ended the holding, to the length between the entrance and the exit of the tenter device 2, was 90%.

The side edge portions of the film 141 were slit off by the edge slitting device 142 within thirty seconds after exiting from the exit 17 of the tenter device 2.

(1-9) Further Drying, Neutralization

The film 141 was dried at the high temperature in the drying chamber 145. The drying air was fed in the drying chamber 145 such that inside the chamber was partitioned into four partitions, and the respective air at 120, 130, 130 and 130° C. was fed into the respective partitions arranged in an order from the upstream side to downstream side from air blowers (not shown). The tension of the film 141 given by the roller 144 in the transporting was regulated to 100N/m and the film 141 was dried for ten minutes so that the content of the remaining solvent in the film 141 finally became to 0.3 mass. %. A wrapping angle (arc of contact) of the roller 144 in winding the film 141 was 90° or 180°. The material of the roller 144 was aluminum or carbon steel, and the hard chrome coating was made on the surface of the roller 144. Two types of the rollers 144 were used. In the first type, the surface of the roller was smooth, and in the second type, matting process is applied on the surface of the roller by blasting. The positional fluctuation (or eccentricity) of the film 141 on the rotating roller 144 was within 50 μm, and the deflection of the roller 144 under 100N/m tension was within 0.5 mm.

The solvent vapor in the drying air was removed by the adsorbing device 146. The adsorbing agent was activated carbon, and the desorption was performed by the dried nitrogen. The water content in the recovered solvent was reduced to at most 0.3 mass. %, and thereafter the recovered solvent was used for the solvent for preparing the dope. The drying air includes not only the solvent vapor but also the plasticizer, the UV-absorbing agent and the like having high boiling points. These components were removed by cooling with use of a cooling device and a preadsorber, and recycled. The adsorption and desorption conditions were set so that VOC (volatile organic compounds) in the exhaust gas might become at most 10 ppm. An amount of the solvent recovered by the condensing method was approximate 90 mass. % of all vapor solvent, and the rest of the vapor solvent was mainly recovered by the adsorption.

The dried film 141 was transported into a first moisture control chamber (not shown). The drying air at 110° C. was fed into an interval section between the drying chamber 145 and the first moisture control chamber. The air with the temperature of 50° C. and the dew point of 20° C. was fed in the first moisture control chamber. Further, in order to reduce the generation of the curling, the film 141 was transported into a second moisture control chamber (not shown). The air with the temperature 90° C. and the humidity of 70% was directly fed onto the film 141 in the second moisture control chamber.

(1-10) Knurling, Winding Condition

The film 141 after the moisture thereof being controlled was cooled to equal to or less than 30° C., and both edge portions thereof were slit off or trimmed by an edge slitting device (not shown). The neutralization device (neutralization bar) 148 was provided so that the charged voltage in the film 141 in transporting was kept in a range of −3 kV to +3 kV. Further, then knurling on the both sides of the film 141 was made with use of the knurling roller 149. The knurling was given such that the film 141 was embossed from one of the both sides. An average width of the area for knurling was 10 mm, and the pressure of the knurling roller 149 was determined so that an average height of convex might be 12 μm higher than the average thickness of the film 141.

Thereafter, the film 141 was transported into the winding chamber 150 in which the temperature and the humidity were kept to 28° C. and 70%. Further, an ionizer (not shown) was provided in the winding chamber 150 so that the charged voltage in the film 141 was kept in a range of −1.5 kV to +1.5 kV. The width of the product film 141 was 1475 mm. The diameter of the winding shaft 151 in the winding chamber 150 was 169 mm. The tension of the film 141 was 300N/m in the beginning of winding, and was 200N/m in the end of winding. The total length of the wound-up film was 3940 m. One length period of weaving measurement on the winding shaft 151 was 400 m, and a fluctuation range (oscillation range) in the width direction of the winding film was ±5 mm. The pressure of the press roller 152 toward the winding shaft 151 was 50N/m. In the winding, the temperature of the film was 25° C., the water content was 1.4 mass, %, and the content of the remaining solvent was 0.3 mass. %. An average speed of the drying of the solvent in the film in the entire process was 20 mass. % (dry measure basis)/min. There did not cause winding looseness, creases and the like while the winding. Further, the winding deviation did not cause in 10 G impact test. In addition, the appearance of the film roll was in a good condition.

The film roll was stored in the storing rack where a temperature of 25° C. and a humidity of 55% RH (relative humidity) for one month. Then, the film roll was examined as same as the above described. According to the examination, any significant change was not recognized. Further, adhesion of the film was not recognized in the film roll. After producing the film 141, there was no remaining casting film 119 on the casting belt 113. In addition, the TPP did not stick to the flapper 32 and the dry bearing 37 of the clip 10 in the tenter device 2, and the mass, formed by the binding between the particles on the dry bearing 37 and the TPP, was not found. The flapper 32 could be rotated very smoothly, and the wet film 3 was held by the clip 10 without fault.

In the above embodiment, the dry bearings 37 are incorporated in the flapper 32, the attachment shaft 35 is inserted to the holes 34a of the flapper attaching portion 34 and the dry bearings 37, and then the attachment shaft 35 is fixed to the flapper attaching portion 34 by the fixing pins 36. However, the construction for attaching the flapper 32 to the frame 31, with allowing the rotation of the flapper 32 around the attachment shaft 35 through the dry bearings 37, is not limited to this embodiment. For example, the attachment shaft 35 may be fixed to the flapper 32, and the dry bearings 37 may be incorporated in the flapper attaching portion 34.

In the above embodiment, six of the fresh air feeding pipes 55 are respectively connected to the portions of the first and second clip covers 51,52 corresponding to each of the dry areas 2a-2c. However, the number of pipes 55 are not limited to this embodiment, as long as the fresh air can be fed in the tenter device 2.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

INDUSTRIAL APPLICABILITY

The present invention is applicable to a plastic optical part such as a plastic optical fiber. The present invention is also applicable to a graded index type plastic optical fiber.

The invention claimed is:

1. A tenter device used in a solution casting apparatus comprising:
   clips for clipping a film and moving for transporting said film, between a clip start position for clipping lateral edges of a film and a clip release position for releasing said clipping of said film;
   a dry air blower for feeding dry air toward said film for drying said film while said film is transported; and
   a clip cover for covering a moving path of said clip in clipping said film; and
   a fresh air blower for feeding fresh air into inside of said clip cover so as to prevent said dry air in outside of said clip cover blowing into inside of said clip cover.

2. A tenter device described in claim 1, said clip comprising:
   a main body having a film holding surface on which said lateral edge of said film is positioned;
   a holding lever swingable between a holding position for holding said lateral edge of said film on said film holding surface and a retreat position for releasing said holding of said film;
   an attaching shaft for attaching said holding lever to said main body; and
   at least one dry bearing supporting said attaching shaft, said dry bearing being formed of material which generate lower dust by wearing compared to material containing lead and is self-lubricating.

3. A tenter device described in claim 2, wherein said dry bearing is formed of polytetrafluoroethylene and solid lubricant.

4. A tenter device described in claim 1, wherein said film is a cellulose acylate film.

5. A tenter device described in claim 1, wherein said fresh air is contained inside said clip cover at a pressure greater than said dry air.

6. A tenter device described in claim 2, wherein said main body comprises a u-shaped frame for allowing said holding lever to swing to a release position.

7. A tenter device described in claim 1, wherein said fresh air comprises outside air, and said fresh air is sent to a dry air recirculation unit for recirculation as dry air.

8. A tenter device described in claim 7, wherein said fresh air is heated to a predetermined temperature range by a heat exchanger located within the dry air recirculation unit.

9. A tenter device described in claim 1, further comprising a triphenyl phosphate (TPP) removing unit which removes vaporized TPP from said dry air which has been fed toward said film for drying said film.

10. A tenter device described in claim 7, further comprising a triphenyl phosphate (TPP) removing unit which removes vaporized TPP from said dry air which has been fed toward said film for drying said film.

11. A tenter device described in claim 9, wherein said dry air exiting said TPP removing unit is mixed with said outside air to flow together as said fresh air.

12. A film drying method for drying a film produced by solution casting, said film being dried by dry air fed from a dry air blower while said film is transported, said transporting of said film being performed by clips for clipping said film and moving between a clip start position for clipping lateral edges of said film and a clip release position for releasing said clipping of said film, said film drying method comprising:
   moving said clip, which is covered by a clip cover, cyclically from said clip start position to said clip release position; and
   feeding fresh air into the inside of said clip cover by a fresh air blower so as to prevent said dry air outside of said clip cover from blowing into the inside of said clip cover.

13. A film drying method described in claim 12, wherein said fresh air is contained inside said clip cover at a pressure greater than said dry air.

* * * * *